US007756978B2

(12) United States Patent
Nakaminami et al.

(10) Patent No.: US 7,756,978 B2
(45) Date of Patent: Jul. 13, 2010

(54) MULTIPLICITY ADJUSTMENT SYSTEM AND METHOD

(75) Inventors: Toshihiro Nakaminami, Zama (JP);
Makoto Kitagawa, Fujisawa (JP);
Mitsuhiko Yoshimura, Tokyo (JP);
Susumu Kobayashi, Yokohama (JP);
Misa Ikeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1427 days.

(21) Appl. No.: 11/129,332

(22) Filed: May 16, 2005

(65) Prior Publication Data
US 2006/0165000 A1    Jul. 27, 2006

(30) Foreign Application Priority Data
Jan. 25, 2005    (JP) ............................. 2005-016250

(51) Int. Cl.
G06F 15/177    (2006.01)
G06F 15/173    (2006.01)
G06F 11/00     (2006.01)

(52) U.S. Cl. ........................ 709/226; 709/220; 714/1

(58) Field of Classification Search ......... 709/220–226; 714/1, 4
See application file for complete search history.

(56) References Cited

U.S. PATENT DOCUMENTS

| 6,850,530 | B1* | 2/2005 | Waclawsky et al. | 370/401 |
| 2003/0236877 | A1* | 12/2003 | Allan | 709/224 |
| 2004/0210871 | A1* | 10/2004 | Hasegawa et al. | 717/120 |
| 2005/0027858 | A1* | 2/2005 | Sloth et al. | 709/224 |
| 2005/0149908 | A1* | 7/2005 | Klianev | 717/109 |

FOREIGN PATENT DOCUMENTS

| JP | 5-143559 | 6/1993 |
| JP | 5-173807 | 7/1993 |

* cited by examiner

Primary Examiner—Nathan Flynn
Assistant Examiner—Joshua Joo
(74) Attorney, Agent, or Firm—Brundidge & Stanger, P.C.

(57) ABSTRACT

A multiplicity adjustment agent collects request information database from a sub-system including an element of a system to be monitored. An individual sub-system's multiplicity adjustment server sorts and merges request information collected from each sub-system for each element/request path. An integrated multiplicity analysis server calculates a necessary multiplicity on the basis of the request information.

4 Claims, 25 Drawing Sheets

MULTIPLICITY ADJUSTMENT SYSTEM AND METHOD

INCORPORATION BY REFERENCE

The present application claims priority from Japanese application JP2005-016250 on Jan. 25, 2005, the content of which is hereby incorporated by reference into this application.

BACKGROUND OF THE INVENTION

The present invention relates to a simultaneous executable multiplicity adjustment system and method for determining a simultaneous executable multiplicity as an upper limit value corresponding to a maximum number of requests simultaneously executable in a distributed system (in particular, Web system) having a plurality of divided sub-systems.

A distributed system (in particular, Web system) having a plurality of functionally-divided sub-systems has a complicated structure because the system has many elements. Even when a system looks like a virtually single system when viewed from system users, the structure of a server is divided into elements according to a logical or physical boundary such as business type, development department, sub-network or the like. By combining such elements called sub-systems, a total system can be realized.

For this reason, the cause of a problem such as performance bottleneck is also complicated, and thus it is difficult to suitably design a multiplicity, considering also the influences on other systems cooperated therewith. Meanwhile, it is desirable to stably run the system and establish optimum system environments satisfying performance requirements. In other words, it is desirable to set the system considering an optimum trade-off between the performance bottleneck and the system stability.

JP-A-5-173807 discloses a technique in which, for solving a performance bottleneck, the number of simultaneously-executable jobs (job executable multiplicity) is set from a job input queue, and the job executable multiplicity is changed according to a measured server load quantity. JP-A-5-143559 discloses a technique in which, of service computers which informed of their load states in response to a load state notification, the service computer having a lightest load is found to be connected.

SUMMARY OF THE INVENTION

However, the techniques disclosed in the aforementioned Patent Documents cannot satisfy both of the system running stability and the effective resource use under some system condition.

In JP-A-5-173807, for example, as a job CPU time is increased (as a load on a server is increased), the job executable multiplicity decreases. In this connection, in an online system (such as a distributed system having a plurality of functionally-divided sub-systems, e.g., a Web system), when a job generation rate or the number of input jobs is small (when a load on a server is small), the job executable multiplicity is increased. From the viewpoint of the effective resource use, however, it is actually desirable to decrease the job executable multiplicity of the job in question and to allocate the server resource to another job (to increase the job executable multiplicity of the other job). In other words, there exists a problem that such a job executable multiplicity as to meet both respects of the system running stability and the effective resource use cannot be determined only from the consideration of the server load.

In JP-A-5-143559, further, when a request goes through a plurality of system elements, it is impossible to determine the job executable multiplicity of each element. This Patent Document also cannot cope with a resource lack or an increased number of jobs caused by increased number of system users.

It is an object of the present invention to provide a multiplicity adjustment system which can assist in designing a simultaneous executable multiplicity (which will be referred to merely as multiplicity, hereinafter) to secure the stable running of the system. Another object of the present invention is to provide a multiplicity adjustment system which can cope with a resource lack or a situation when a request generation rate (the number of generated requests per unit time) is increased by an increased number of system users.

In accordance with the present invention, the above objects can be attained by providing a multiplicity adjustment system for adjusting the multiplicity of a request to a system to be watched which, on the basis of a request to one of elements included in the watch system of interest, calculates the multiplicity of a request to each element, acquires information about the request multiplicity from the multiplicity adjustment agent, and stores the acquired information as request information for each element. And the system also acquires the stored request information for each element, analyzes the request multiplicity of each element on the basis of the acquired request information, and changes the request multiplicity for each element according to the analyzed result.

Other objects, features and advantages of the invention will become apparent from the following description of the embodiments of the invention taken in conjunction with the accompanying drawings.

DETAILED DESCRIPTION OF THE EMBODIMENTS

Preferred embodiments of the present invention will be detailed by referring to the accompanying drawings. However, the present invention is not limited to the specific example.

Embodiment 1

Figure 1:
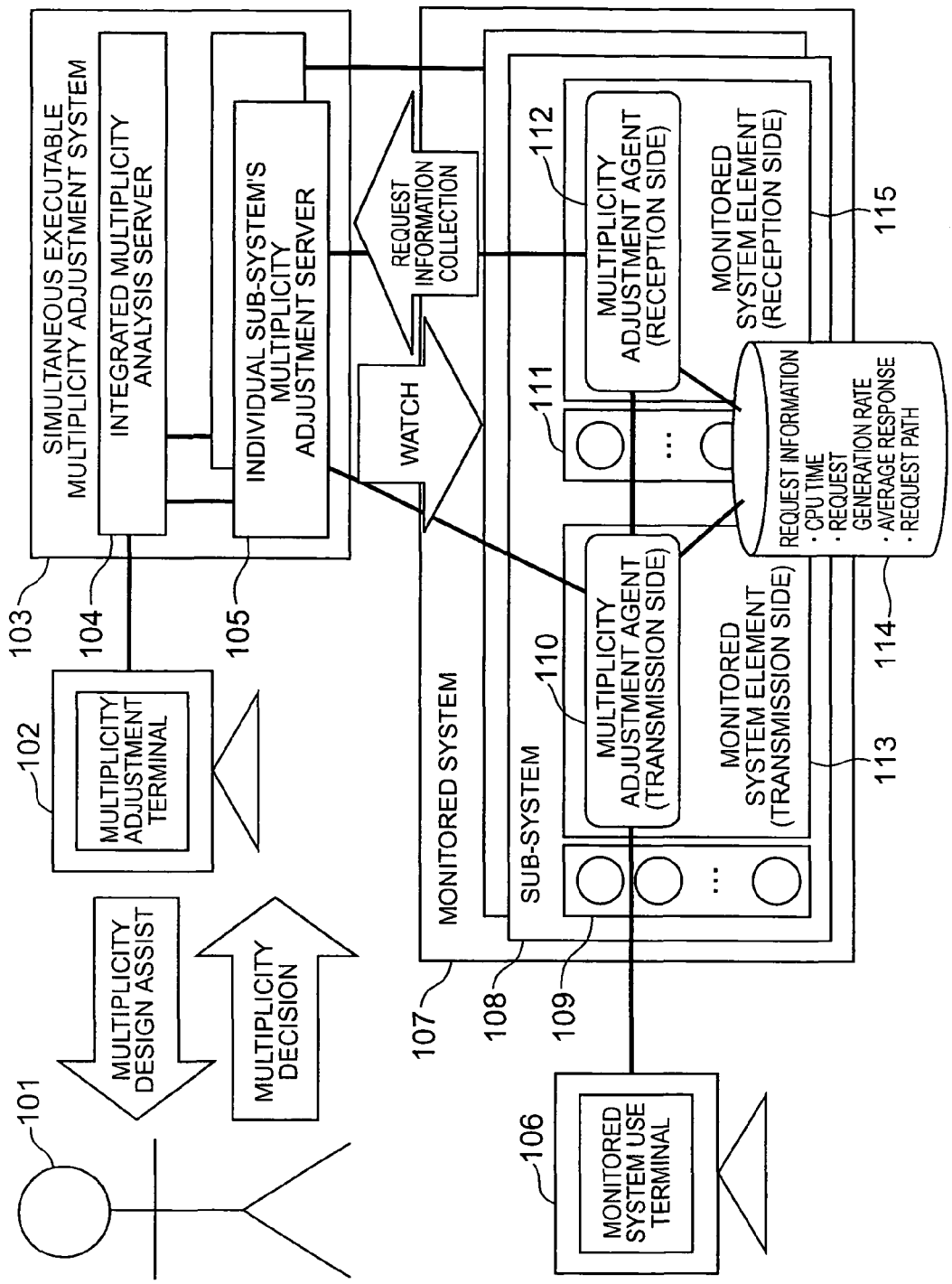
FIG. 1 is a general configuration of a multiplicity adjustment system in accordance with an embodiment of the present invention.

FIG. 1 shows a general configuration of a system in accordance with the present embodiment. As shown in FIG. 1, a simultaneous executable multiplicity adjustment system 103 is arranged to watch a system 107 to be monitored.

The monitored system 107 is made up of a plurality of sub-systems. These sub-systems can be used by a monitored system use terminal 106 connected therewith. In FIG. 1, the structure of only one 108 of the plurality of sub-systems is shown. The sub-system 108 has monitored system elements 113 and 115, and a plurality of multiplicity adjustment agents 110 and 112 for individually watching the monitored system elements 113 and 115. The monitored system elements 113 and 115 include queues 109 and 111 for limiting the multiplicity. The multiplicity adjustment agents 110 and 112 are connected to a request information database 114 for storing information obtained from the monitored system elements 113 and 115.

The simultaneous executable multiplicity adjustment system 103 has an individual sub-system's multiplicity adjustment server 105 and an integrated multiplicity analysis server 104. The individual sub-system's multiplicity adjustment server 105, which is provided for each sub-system, functions to individually watch the sub-system 108 through the multiplicity adjustment agents 110 and 112 to collect request information. The integrated multiplicity analysis server 104 integrates a plurality of individual sub-system's multiplicity adjustment servers 105. A multiplicity adjustment terminal 102 is connected to the integrated multiplicity analysis server 104. An operator 101 of the monitored system 107 can obtain design assist information about multiplicity from the integrated multiplicity analysis server 104 via the multiplicity adjustment terminal 102.

As mentioned above, since the multiplicity adjustment system individually watches the monitored system elements 113 and 115 to collect information necessary for determining a multiplicity for each element, this can assist the operator in designing an optimum multiplicity for the entire system. Further, definition information for setting a multiplicity for each distributed product can be managed at one location across products.

Figure 2:
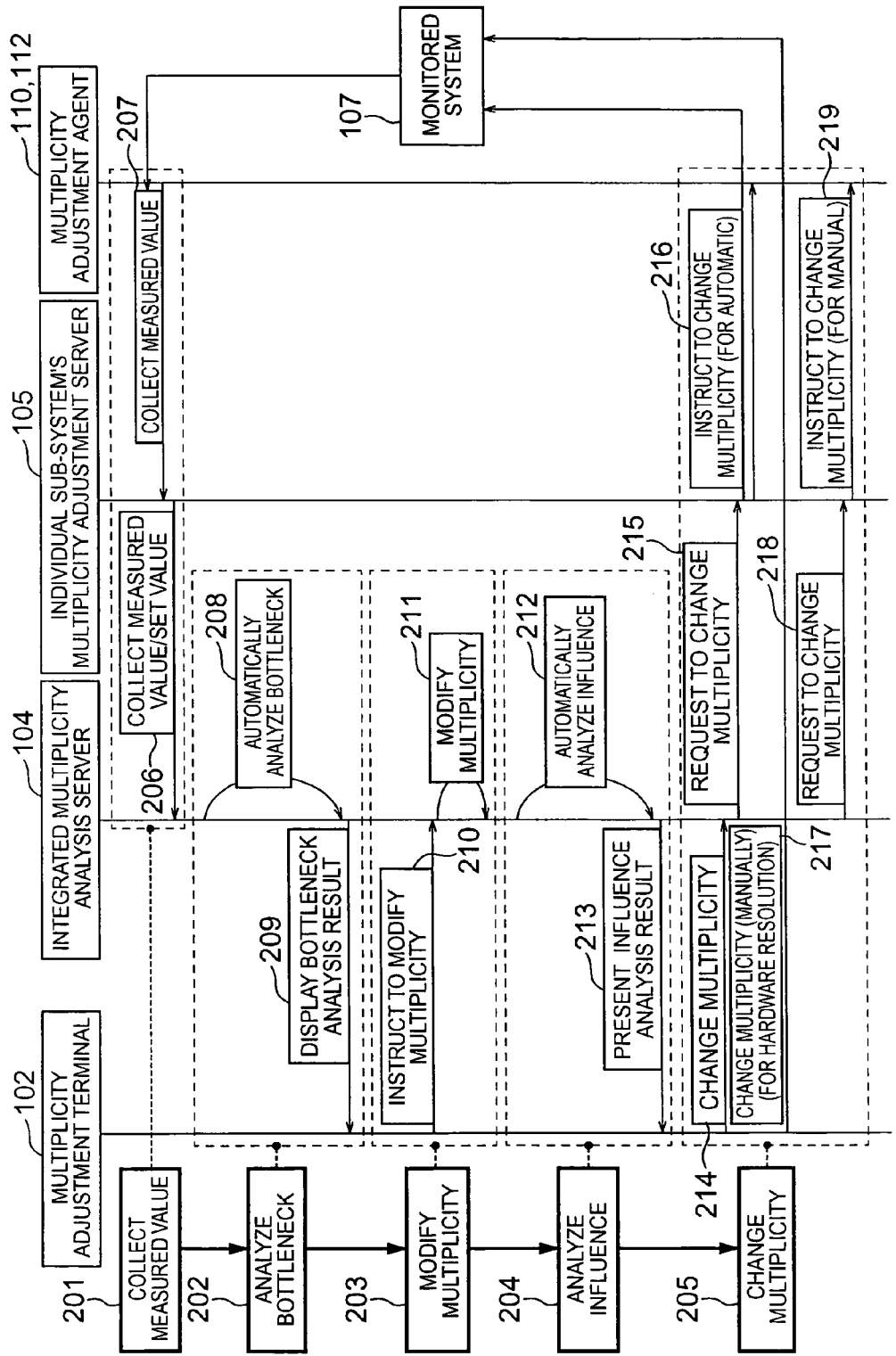
FIG. 2 is a sequence diagram showing a summary of processing operation of the system.

FIG. 2 is a schematic sequence diagram showing a relation between processing flows and functional modules in the system of FIG. 1. Blocks surrounded by thick lines on the left side of FIG. 2 show a summary of processing operation steps, and blocks surrounded by dotted lines on the right side of the left-side blocks show details of the respective step operations. Blocks on the upper side of the drawing indicate operations to be carried out by the terminal, the server and so on. In the present embodiment, "modify" and "change" of a multiplicity are defined as follows.

"Modify": To virtually set a multiplicity on the integrated multiplicity analysis server 104. And the multiplicity is not actually set yet.

"Change": To actually set a multiplicity for the element of the monitored system 107.

In FIG. 2, first of all, actually measured values are collected (Step 201). More specifically, the multiplicity adjustment agents 110 and 112 collect actually measured values (Step 207). That is, the multiplicity adjustment agents 110 and 112 collect request-associated actually-measured values generated by the actual system operation from the monitored system 107, and transmit the collected actually measured values as request information to the individual sub-system's multiplicity adjustment server 105. The individual sub-system's multiplicity adjustment server 105 then collects the actually measured values and set values (Step 206) and transmits the actually measured values and the multiplicity set values for each element to the integrated multiplicity analysis server 104. The details of Step 201 will be explained later in FIG. 12.

After Step 201, a bottleneck in the monitored system 107 is analyzed (Step 202). More specifically, the integrated multiplicity analysis server 104 automatically analyzes the bottleneck on the basis of the information collected from the individual sub-system's multiplicity adjustment server 105 in Step 201 (Step 208). The integrated multiplicity analysis server 104 transmits its analyzed result to the multiplicity adjustment terminal 102, which in turn displays the analyzed result information (Step 209). The details of Step 202 will be explained later in FIGS. 13 to 17.

Subsequent to Step 202, a multiplicity modification process is carried out (Step 203). More specifically, the operator of the monitored system determines a suitable multiplicity on the basis of the above bottleneck analysis result information and modifies the multiplicity from a multiplicity modify/change view 320. The multiplicity adjustment terminal 102 transmits a multiplicity modification instruction to the integrated multiplicity analysis server 104 on the basis of an entry from the monitored system operator (Step 210). And the integrated multiplicity analysis server 104 modifies the multiplicity on the basis of the transmitted information (Step 211). The details of Step 203 will be explained later in FIG. 18.

Subsequent to Step 203, an influence analysis process is carried out (Step 204). More specifically, the integrated multiplicity analysis server 104 automatically analyzes an influence on the basis of the multiplicity modified in Step 203 (Step 212), the integrated multiplicity analysis server 104 transmits its influence analyzed result to the multiplicity adjustment terminal 102, and the multiplicity adjustment terminal 102 in turn displays the influence analysis result information (Step 213). The details of Step 204 will be explained later in FIGS. 19 to 22.

Subsequent to Step 204, a multiplicity change process is carried out (Step 205). More specifically, when the monitored system operator enters a multiplicity in the multiplicity modify/change view 320 of the multiplicity adjustment terminal 102 on the basis of the influence analysis result information displayed in Step 204, the multiplicity adjustment terminal 102 transmits the entered multiplicity change information to the integrated multiplicity analysis server 104 (Step 214). And the integrated multiplicity analysis server 104 transmits a multiplicity change request to the individual sub-system's multiplicity adjustment server 105 (Step 215). The individual sub-system's multiplicity adjustment server 105 in turn increases the multiplicity set value of the monitored system 107, and thereafter instructs the multiplicity adjustment agents 110 and 112 to change the multiplicity (Step 216). The details of Step 204 will be explained later in FIG. 24.

Through the above operations, information necessary for determining a multiplicity for each element is collected, an element forming a bottleneck is searched for on the basis of the collected information (bottleneck analysis process), and a multiplicity for the bottleneck element is temporarily modified. Thus, an influence on the other elements caused by the multiplicity change (influence analysis process) or the like can be carried out, and the design of a multiplicity optimum for the entire system can be assisted. Once the multiplicity is determined, system arrangement can be automatically changed so as to satisfy the multiplicity.

Although the processes of collecting actually measured values and set values in Steps 206 and 207 are of a push type (wherein information acquired by an information generation originator is transmitted to an information collection destination), the processes may be of a pull type (wherein an information collection destination collects information acquired by an information generation originator). The push type process, which can collect request information on a real-time basis, is advantageous in that dynamic optimization of a multiplicity enables dynamic redistribution of server resources. The pull type process, on the other hand, is advantageous in that a monitored system operator or administrator can collect, as necessary, information necessary for multiplicity design in a necessary period and can determine a prefixed optimum multiplicity set value. For this reason, since an overhead to the system caused by dynamic multiplicity change can be reduced, system performance can be advantageously secured.

Figure 3:
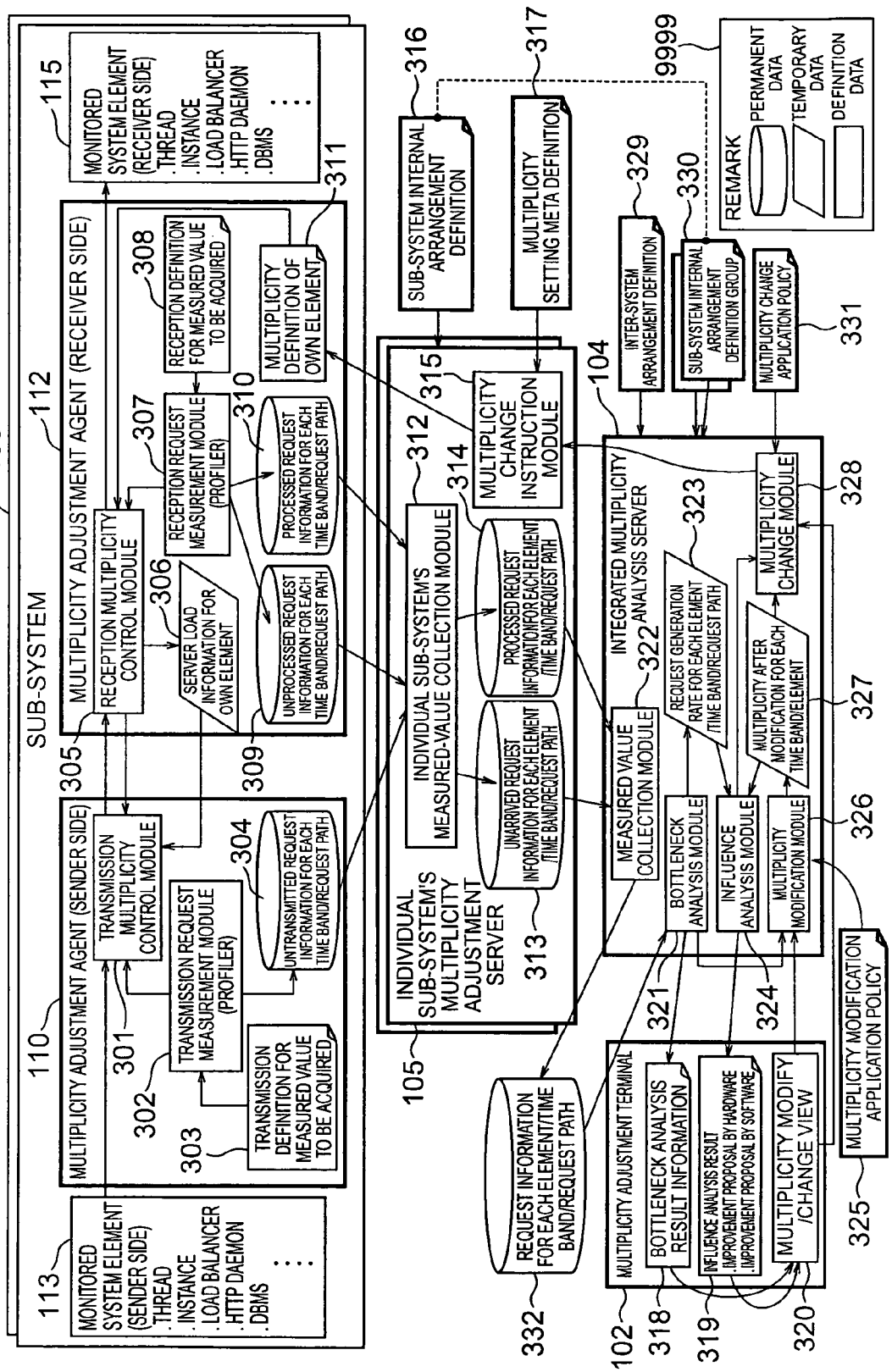
FIG. 3 is a configuration of the multiplicity adjustment system of FIG. 1, showing detailed structures therein.

FIG. 3 shows details of a system configuration shown in FIG. 1. Meanings of information and definitions in FIG. 3 are shown in a Remark 9999. In the present embodiment, the integrated multiplicity analysis server 104 operable by the terminal 102 connected to a network manages the respective sub-systems 108 via the individual sub-system's multiplicity adjustment server 105. The sub-system 108 has the monitored system elements 113 and 115 of the monitored system connected via the network and the multiplicity adjustment agents 110 and 112 for watching these elements 113 and 115. The multiplicity adjustment agent 110 watches the monitored system element 113 in the sender side; while the multiplicity adjustment agent 112 watches the monitored element 115 in the receiver side. More in detail, the monitored system elements 113 and 115 refer to functional modules such as thread, instance, load balancer, HTTP daemon and DBMS; or system elements on which the multiplicity adjustment agents 110 and 112 can directly perform a multiplicity control process or a load balance process. FIG. 3 is different from FIG. 1 in an envelope relation between the monitored system elements 113 and 115 and the multiplicity adjustment agents 110 and 112. However, both arrangements of FIGS. 1 and 3 are essentially the same in the operations of the present embodiment.

The multiplicity adjustment agent 110 includes a transmission multiplicity control module 301 and a transmission request measurement module 302. The transmission multiplicity control module 301 performs the load balance process and multiplicity control process on the monitored element 115 on the basis of the multiplicity set value changed in the multiplicity change process (Step 205 in FIG. 2). The transmission request measurement module 302 performs the actually-measured value collection process (Step 207 in FIG. 2). More specifically, the module 302 acquires untransmitted request information 304 for each time band/request path from the sender-side monitored system element 113 on the basis of a transmission definition 303 for an actually measured value to be acquired. In this example, the "request path" indicates a path for a request to go through system elements. Details of a data structure expressing a request path will be later explained in the form of a request path definition 918 in FIG. 9.

Figure 9:
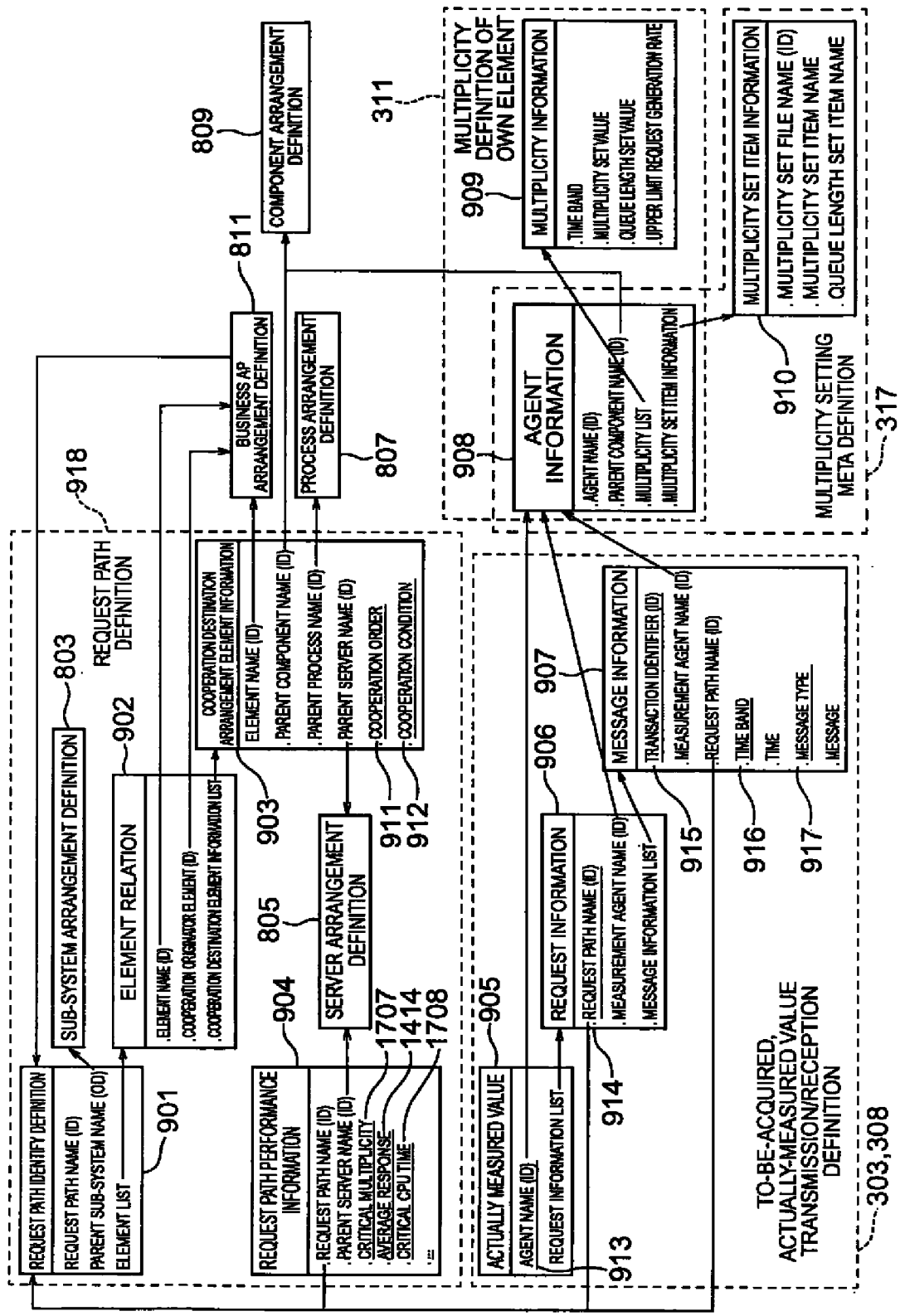
FIG. 9 is a data structure showing a structure of history and definition information.

In the transmission definition 303 of an actually measured value to be acquired, information to be acquired is defined. The detailed structure of the transmission definition 303 is shown in FIG. 9 and explained later. In the untransmitted request information 304 for each time band/request path, untransmitted requests acquired by the transmission request measurement module 302 are classified according to each time band/request path.

The multiplicity adjustment agent 112 includes a reception multiplicity control module 305 and a reception request measurement module 307. The reception multiplicity control module 305 performs a load balance process and a multiplicity control process on the monitored element 115 on the receiver side; whereas, the reception request measurement module 307 acquires unprocessed request information 309 for each time band/request path and processed request information 310 for each time band/request path from a request to the monitored element 115 on the receiver side.

Server load information 306 on its own element indicates the load state of the monitored system element 115 on the receiver side. A reception definition 308 for an actually measured value to be acquired defines information to be acquired (, which is shown in FIG. 9 in the form of its detailed structure). In the unprocessed request information 309 for each time band/request path, unprocessed requests acquired by the reception request measurement module 307 are classified according to each time band/request path. In the processed request information 310 for each time band/request path, processed requests acquired by the reception request measurement module 307 are classified according to each time band/request path. In a multiplicity definition 311 of its own element, information about the simultaneous executable multiplicity of the monitored system element 115 on the receiver side is defined, and the detailed structure of the definition is shown in FIG. 9.

Explanation will be made in detail as to the transmission multiplicity control module, transmission request measurement module 302, reception multiplicity control module 305, and reception request measurement module 307 in the multiplicity adjustment agents 110 and 112.

Explanation will first be directed to the transmission multiplicity control module 301. When the monitored system element 113 tries to transmit a request to the system element 115 for executing a business logic in the receiver side, the transmission multiplicity control module 301 once traps the request. And the module 301 decides whether or not to transmit the request on the basis of the server load information 306 of its own element and the multiplicity definition 311 of its own element. When deciding to transmit the request, the module 301 decides one of clustered system elements 115 to which the module transmits the request, and performs the load balance process and the multiplicity control process.

Explanation will next be made as to the transmission request measurement module 302. When the transmission multiplicity control module 301 decides that transmission of the received request is impossible, the transmission request measurement module 302 acquires necessary information from information about the request on the basis of the transmission definition 303 for an actually measured value to be acquired. And the module 302 stores the acquired information in the untransmitted request information 304 for each time band/request path. Lastly, the module 302 returns an error to the monitored system element 113 on the transmission side.

The reception multiplicity control module 305 will then be explained. When a request is transmitted from the monitored system element 113 in the transmission side to the monitored system element 115 on the reception side, the reception multiplicity control module 305 once traps the request. And the module 305 decides whether or not to process the request on the basis of the server load information 306 of its own element and the multiplicity definition 311 of its own element. When deciding to process the request, the module 305 performs the load balance process and the multiplicity control process by deciding one of clustering elements 115 to which the module transmits the request.

Explanation will lastly made as to the reception request measurement module 307. The reception multiplicity control module 305 decides that processing of the received request is impossible, the reception request measurement module 307 acquires necessary information from information about the request on the basis of the reception definition 308 for an actually measured value to be acquired. And the module 307 stores the acquired information in the unprocessed request information 309 for each time band/request path. Lastly, the module 307 returns an error to the monitored system element 113 in the transmission side. Meanwhile, when the reception multiplicity control module 305 decides to process the received request, the reception request measurement module 307 acquires necessary information from information about the request on the basis of the reception definition 308 for an actually measured value to be acquired. And the module 307 stores the acquired information in the processed request information 310 for each time band/request path. Finally, the module 307 issues the request to the monitored system element 115 on the reception side.

The individual sub-system's multiplicity adjustment server 105 includes an individual sub-system's measured-value collection module 312 and a multiplicity change instruction module 315 for instructing the multiplicity adjustment agents 110 and 112 to change the multiplicity.

The individual sub-system's measured-value collection module 312, on the basis of a sub-system internal arrangement definition 316, collects and merges the untransmitted request information 304 for each time band/request path and the unprocessed request information 309 from each time band/request path from the multiplicity adjustment agents 110 and 112, classifies the collected information according to each element, and stores the classified information in an unarrived request information 313 for each element/time band/request path. The individual sub-system's measured-value collection module 312 further collects the processed request information 310 for each time band/request path from the multiplicity adjustment agents 110 and 112, classifies the collected information according to each element, and stores the classified information in processed request information 314 for each element/time band/request path.

The multiplicity change instruction module 315, when accepting a multiplicity change instruction from the integrated multiplicity analysis server 104, changes the multiplicity set value of the multiplicity definition 311 of its own element for the multiplicity to be changed on the basis of a multiplicity setting meta definition 317.

Figure 8:
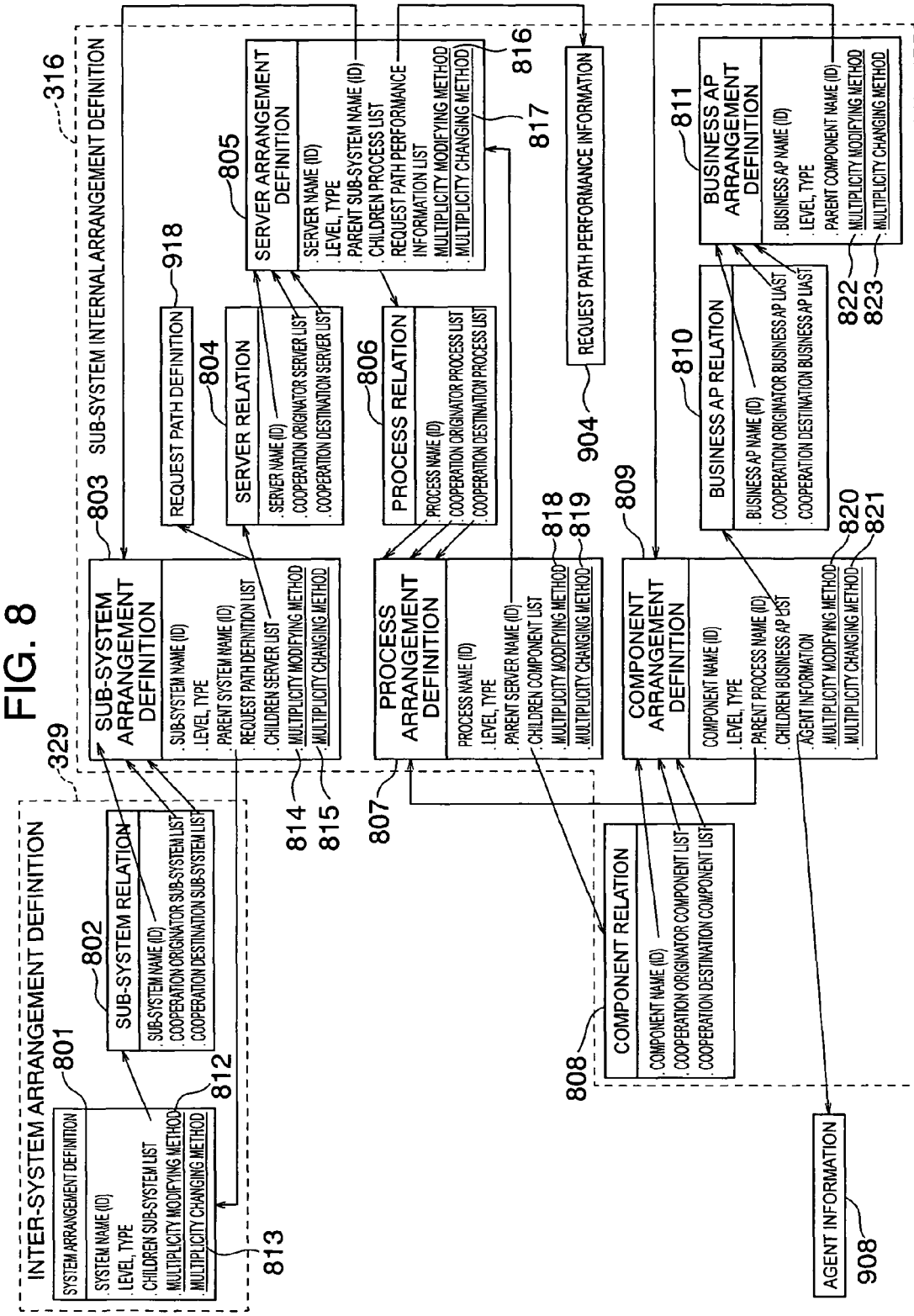
FIG. 8 is a data structure showing structures of intersystem arrangement definition and sub-system internal arrangement definition.

In this case, in the sub-system internal arrangement definition 316, relations between a plurality of elements in a sub-system and structure thereof are recorded. The detailed structure of the definition 316 is shown in FIG. 8. The multiplicity setting meta definition 317 indicates what item in what definition file indicates a multiplicity parameter. The detailed structure of the definition 317 will be later explained in FIG. 9.

Explanation will finally made as to a summary of the integrated multiplicity analysis server 104. The integrated multiplicity analysis server 104 includes a measured value collection module 322 for collecting request information, a bottleneck analysis module 321 for analyzing a bottleneck in a monitored system, a multiplicity modification module 326 for temporarily modifying a multiplicity, an influence analysis module 324 for analyzing the influence of the temporarily-modified multiplicity on the entire monitored system, and a multiplicity change module 328 for actually changing an actual multiplicity set value for the monitored system.

The load balance process in the multiplicity control modules 301 and 305 in the multiplicity adjustment agents 110 and 112 are not indispensable or essential, and thus it is only required for the process to be carried out on any one of the transmission and reception sides. Further, the function of performing the load balancing process and the multiplicity control process may be provided, in some cases, by an existing application server product. When such an application server is employed, the multiplicity control modules 301 and 305 are arranged, in many cases, in the interiors of the monitored system elements 113 and 115 in the form of a plug-in or library (see the configuration of FIG. 1). When the multiplicity control modules 301 and 305 are newly mounted, on the other hand, these modules can be realized by externally arranging the modules outside of the monitored system elements 113 and 115 (see the arrangement of FIG. 3). Further, if it is difficult to mount the multiplicity control on the transmission side, then the multiplicity control may be carried out only on the reception side. In this case, since generation of an untransmitted request in the transmission side can be avoided, provision of the transmission request measurement module 302 becomes unnecessary.

With respect to the timing of collecting request information, the request measurement modules 302 and 307 may transmit a request periodically to the individual sub-system's measured-value collection module 312 or each time that the request is generated, or the individual sub-system's measured-value collection module 312 may periodically collect such a request. The collection of request information can be realized even by an existing profiler product. When a profiler is employed, the request measurement modules 302 and 307 are used as plugs-in or libraries, or are provided, in many cases, within the monitored system elements 113 and 115, for example, by changing a program and embedding the module therein (refer to the configuration of FIG. 1). When the request measurement modules 302 and 307 are newly mounted, it can be realized by providing the modules outside of the monitored system elements 113 and 115 (refer to the configuration of FIG. 3).

With respect to the timing of reflecting the multiplicity definition 311 of its own element on the multiplicity control modules 301 and 305, the multiplicity control modules 301 and 305 may periodically reload a multiplicity set value. Or each time that the multiplicity change instruction module 315 changes a multiplicity set value, the module 315 may instruct the multiplicity control modules 301 and 305 to reload the multiplicity set value. In this case, in order to avoid the influence thereof on the request during process, it is desirable that the process of reloading a multiplicity set value be carried out in the following procedure. That is, (1) the acceptance of a request to the multiplicity control modules 301 and 305 is suspended (blockaded). (2) The system waits for until the request process during process is fully completed. (3) At the time point that the request during process becomes null, the system reloads a multiplicity set value. (4) Finally, the system releases the blockade.

As mentioned above, by changing the number of the multiplicity control modules 301 and 305 or the number of the transmission request measurement modules 302 or by utilizing an existing product, the system can have an arrangement which pays consideration to the balance between the availability or performance demanded by the system and the operational load of the operator/administrator of the monitored system. For this reason, the present invention can advantageously support the optimum system configuration realizing compatibility between the secured performance and system running stability and the design work of deriving parameter values. Further, the present invention has an advantage that server resources can be dynamically redistributed in real time by shortening a timing interval of collecting a request and automatically changing the multiplicity set value.

Figure 4:
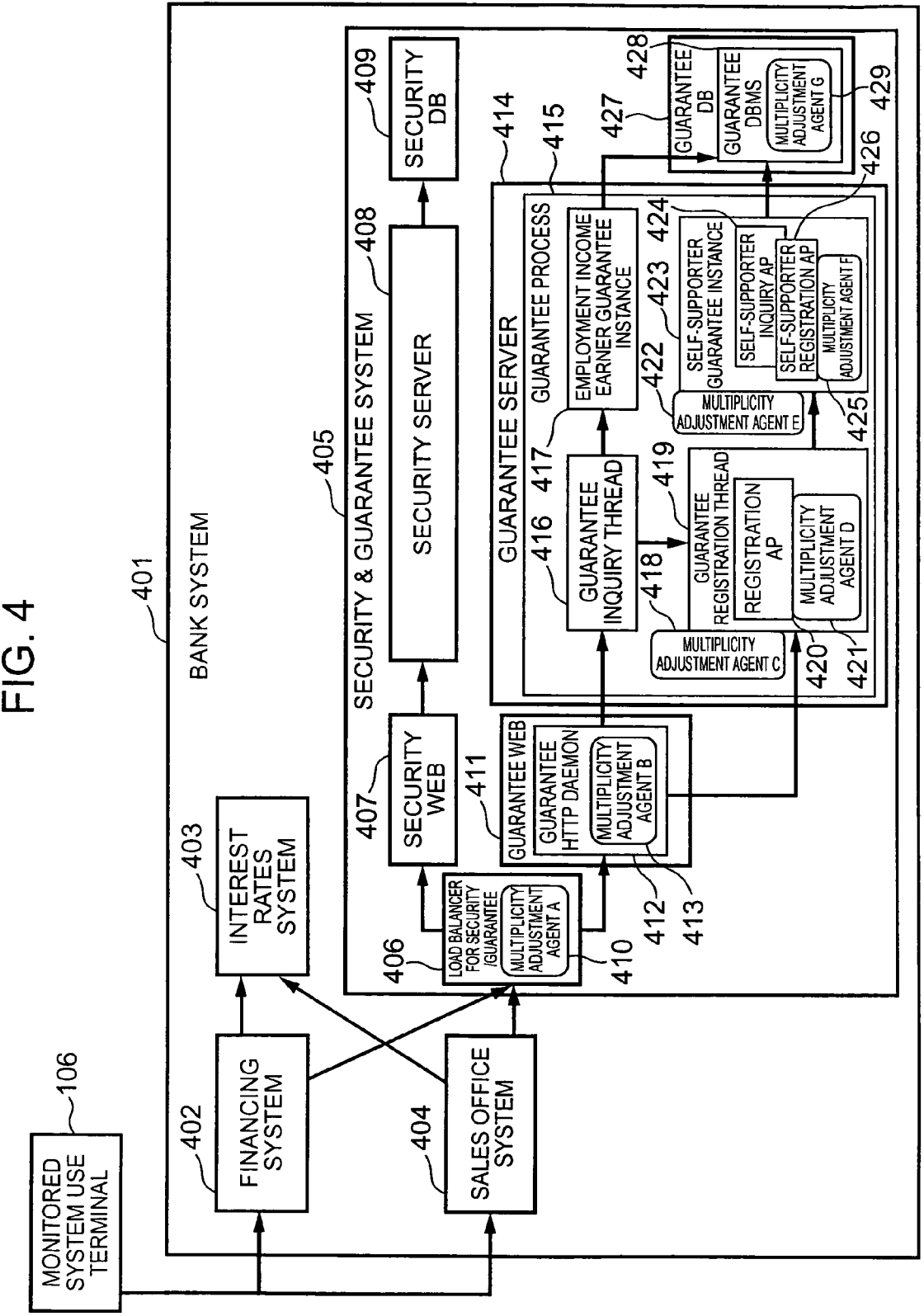
FIG. 4 is an arrangement of a bank system as a specific example of a system to be watched.

FIG. 4 is a general configuration of a bank system 401 as an example of the monitored system 107. A large scale system such as the bank system 401 has sub-systems specialized in respective businesses. In FIG. 4, a financing system 402, a sales office system 404, an interest rates system 403, and a security & guarantee system 405 correspond to the sub-systems 108 in FIG. 1. In FIG. 4, the general configuration of the bank system 401 will be explained in connection with an example of paths of a request going through the bank system 401.

A request issued from the monitored system use terminal 106 (browser) arrives at the interest rates system 403 or the security & guarantee system 405 via the financing system 402 or the sales office system 404. The request arrived at the security & guarantee system 405 is distributed from a load balancer 406 for security & guarantee to a security Web 407 and a guarantee Web 411.

The request arrived at the security Web 407 is sent to a security server 408 and a guarantee database (DB) 409. Meanwhile, the request arrived at the guarantee Web 411 is distributed to a guarantee inquiry thread 416 and a guarantee registration thread 419. The request arrived at the guarantee inquiry thread 416, as necessary, accesses guarantee instance 417 or the guarantee registration thread 419, and accesses the employment income earner guarantee instance 417 and further a guarantee DB 427. The request arrived at the guarantee registration thread 419, on the other hand, accesses, as necessary, a self-supporter guarantee instance 423 before or after the execution of the business operation of a registration AP 420 or in the middle thereof.

The request arrived at the self-supporter guarantee instance 423 accesses, as necessary, the guarantee DB 427 before or after the execution of the business operation of a self-supporter inquiry AP 424 or a self-supporter registration AP 426 or in the middle thereof.

In the bank system 401 of the present embodiment, connection relations between the browser, load balancer, Web server, AP server, and DB server are as shown in FIG. 4. However, the actual connection relations therebetween can be realized in multiple-to-multiple connection. Although an example wherein connection between the browser and the Web server is made in HTTP (Hyper Text Transfer Protocol) is shown in the bank system 401 of FIG. 4, another protocol supported by the load balancer such as FTP (File Transfer Protocol) may be employed. A system arrangement without any load balancer may also be possible. Further, the connection relation between the AP server and process, the connection relation between the process and thread or instance, and the connection relation between the thread or instance and business AP may also be realized in multiple-to-multiple connection.

As has been explained above, in accordance with the present invention, even when the bank system 401 has any complex arrangement, use of the method of FIGS. 12 to 24 advantageously enables support of the optimum multiplicity design.

In the present embodiment, system elements in FIG. 4 are all shown as logically different elements. For example, the security server 408 and a guarantee server 414 are shown, assuming that logically different business applications are running. In the drawing, accordingly, such a plurality of physically divided elements that an identical type of plural AP servers are running for the purpose of increasing availability of AP server clustering or the like, are all regarded as an identical element and thus represented by a single element. Increasing availability represented by typical clustering also means to increase a sort of critical multiplicity by scale-out. In the case where the logical arrangement is considered (the boundary between the elements is considered) in view of the multiplicity as in the present embodiment, this means that such elements can be regarded as the same element. In this connection, the "critical multiplicity" as used therein means a multiplicity when the throughput is saturated and the server cannot run stably.

Figure 5:
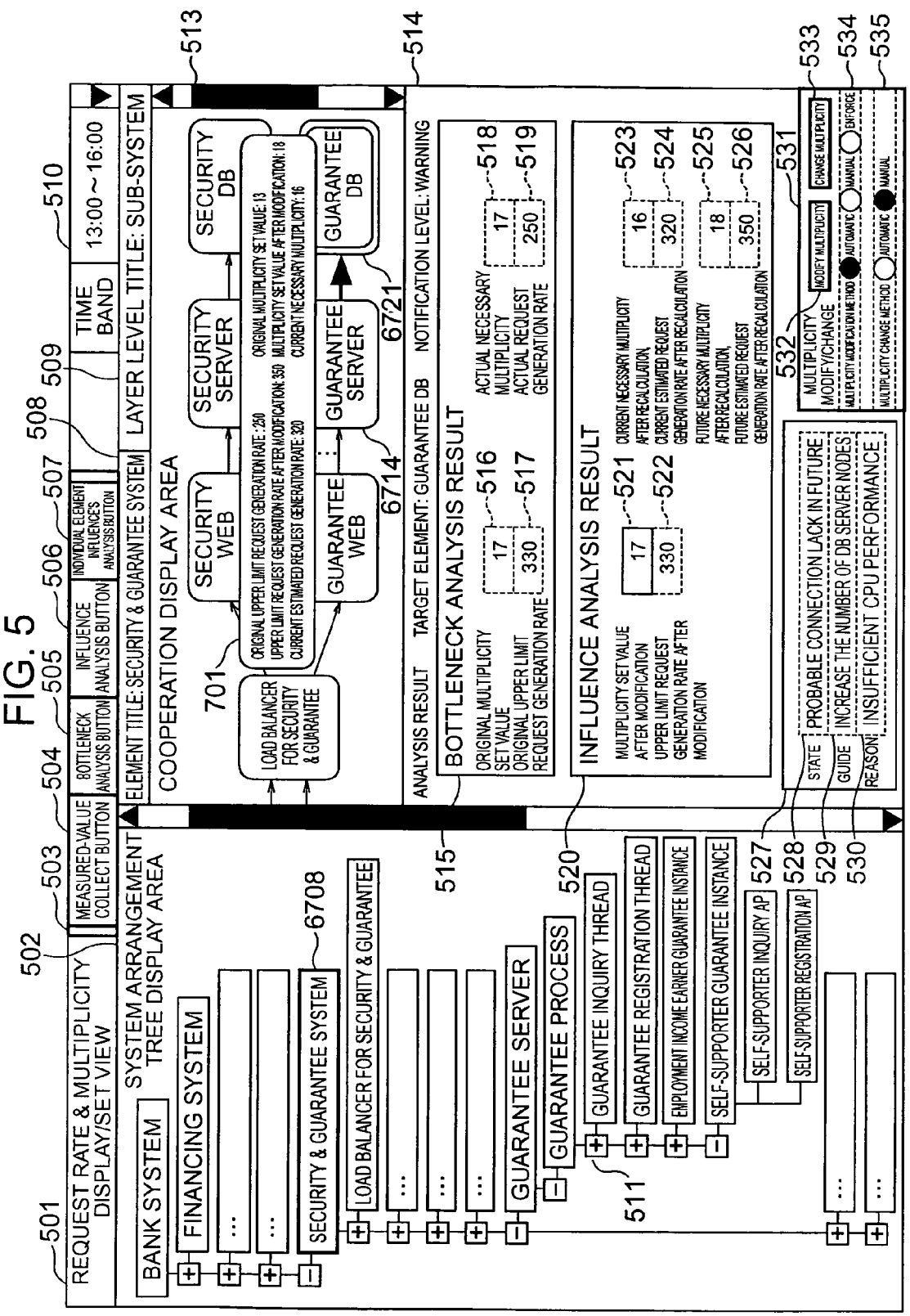
FIG. 5 is a display screen showing a view for displaying/setting a request generation rate and a multiplicity.
Figure 6:
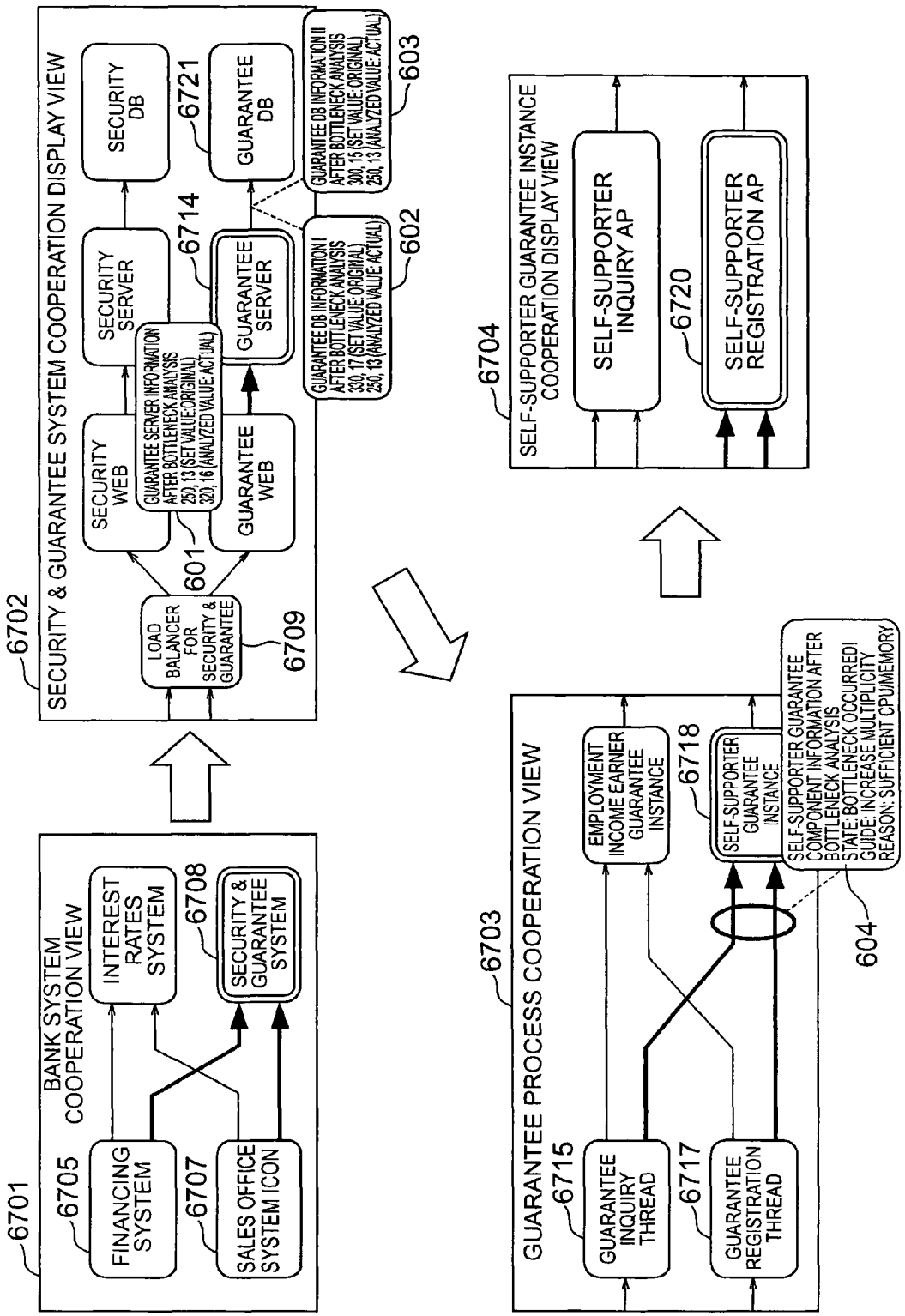
FIG. 6 shows details of cooperated display screens after bottleneck analysis.
Figure 7:
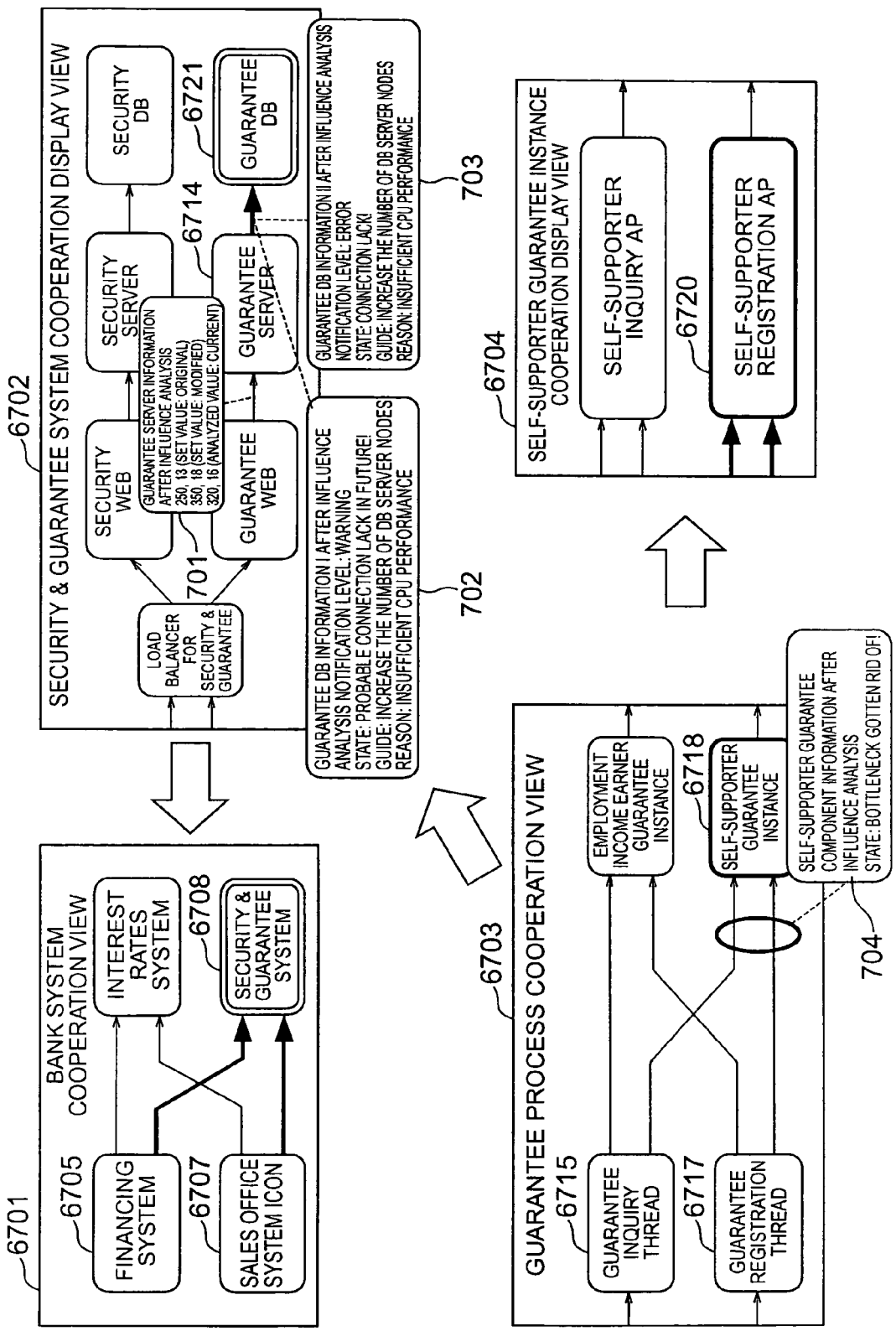
FIG. 7 shows details of the cooperated display screens after influence analysis.

FIGS. 5 to 7 show display view images of result information displayed after bottleneck analysis and after influence analysis.

FIG. 5 shows a display view 501 for displaying and setting a request generation rate and a multiplicity. The word "request generation rate" refers to the number of generated requests per unit time. The request rate & multiplicity display/set view 501 mainly includes (1) a toolbar 503 for conducting various sorts of operations, (2) a system arrangement tree display area 502 for displaying system elements as a layer-by-layer tree from upper layer level to lower on the basis of an inter-system arrangement definition 329 (see FIG. 3) and a group of sub-system internal arrangement definitions 330 (see FIG. 3), (3) an element title display area 508 for displaying the title of an element (parent element) selected on the system arrangement tree display area 502 and a layer level title display area 509 for displaying the title of a layer level of the parent element, (4) an cooperation display area 513 indicative of how system elements in the same layer are cooperated, (5) an analysis result display area 514 for displaying bottleneck analysis result information 318 (see FIG. 3) or an influence analysis result 319 (see FIG. 3), and (6) a multiplicity modify/change area 531 for modifying/changing a multiplicity. Each of the respective sections (1) to (6) will be detailed below.

(1) The toolbar 503 has a measured-value collect button 504 to be clicked when the operator wants to conduct the measured-value collection process (Step 201 in FIG. 2), a bottleneck analysis button 505 to be clicked when the operator wants to conduct the bottleneck analysis process (Step 202 in FIG. 2), an influence analysis button 506 to be clicked when the operator wants to conduct the influence analysis process (Step 204 in FIG. 2), an individual element influence's analysis button 507 to be clicked when the operator wants to analyze the influence analysis process (Step 204 in FIG. 2) with only the influence of a specific element interior (a security & guarantee system 6708 being selected as the specific element in the example of FIG. 5), and a time band list box 510 to be clicked when the operator wants to change a display time band.

When the processing time of the influence analysis process 204 of the entire system is long, a local influence can be grasped in a short time by using the individual element influence's analysis button 507. Thereafter, when the influence of the entire system is recognized or grasped by using the influence analysis button 506, a multiplicity design work time can be shortened. That is, this can advantageously reduce a try and error frequency for system tuning based on multiplicity.

(2) In the system arrangement tree display area 502, system elements are classified according to various levels (system, sub-system, node (server), process, component (thread or instance), business AP) to represent envelope relations between the elements in the form of a tree. In the display area 502, respective rectangular blocks indicate system elements which are displayed to have lower layers as the layer goes from upper layer level to lower on the paper sheet. The title of each element is given in each block. The elements on the display area 502 are given as an example of the bank system in FIG. 4.

The system arrangement tree display area 502 can assist the operator/administrator of the monitored system in his design work, since the operator/administrator can visually know the entire structure of the system therefrom and promote his understanding of the system structure.

In the system arrangement tree display area 502, further, the security & guarantee system 6708 is surrounded by a block of a thick frame. This means that the cooperative state of elements (children elements in lower layer levels of the security & guarantee system 405) of node levels of the security & guarantee system is displayed in the cooperation display area 513. When an element being displayed on the cooperation display area 513 is displayed to be emphasized or highlighted by a thick frame block or the like in the system arrangement tree display area 502 in this manner, the operator can visually know the position of the element in the entire system. As a result, the visual knowing enables the operator to get easy understanding of the range of the multiplicity to be optimized, and thus it can assist the operator in his design work. Further, when the operator clicks a plus button, this causes a list of children elements at lower layer levels of the system element in question to be developed and displayed. Clicking a minus button causes a list of children element belonging to the system element in question to be closed.

(3) In FIG. 5, "security & guarantee system" as the title of the parent element selected in the system arrangement tree display area 502 is displayed on the element title display area 508. A "sub-system" as the title of the layer level of the parent element is displayed on the layer level title display area 509.

(4) The cooperation display area 513 shows the internal structure of the element (the security & guarantee system 6708 in the case of FIG. 5) selected in the system arrangement tree display area 502. When the operator moves a mouse pointer to each element displayed in the cooperation display area 513, this causes simple information about the element to appear as a pop-up hint. Guarantee server information after influence analysis is displayed, for example, as a pop-up hint 701 for a guarantee server icon 6714. Details of display contents of the pop-up hint 701 will be explained in FIGS. 6 and 7. A guarantee DB icon 6721 is surrounded by a thick frame line. This means that the detailed analysis result of the element in question is displayed on the analysis result display area 514.

From the cooperation display area 513, the operator can visually know a possible range influenced by the multiplicity change. As a result, the operator can get easy understanding of a range of multiplicity to be optimized and this can assist the operator in his design work. Since the element displayed on the analysis result display area 514 is highlighted by a thick frame line or the like in the cooperation display area 513 in this way, the operator can visually know the position of the element of interest in the parent element. As a result, since a range of multiplicity to be optimized can be made easy to understand, this can assist the operator in his design work.

(5) Shown in the analysis result display area 514 is an analysis result of the guarantee DB 427 (refer to FIG. 4) corresponding to the guarantee DB icon 6721 selected in the cooperation display area 513. A result after the execution of the bottleneck analysis process (Step 202 in FIG. 2) is displayed in a bottleneck analysis result area 515. A result after the execution of the influence analysis process (Step 204 in FIG. 2) is displayed in an influence analysis result area 520. A detailed explanation of a result after the execution of the bottleneck analysis process 202 or the influence analysis process 204 as well as how to cope with the result are displayed in an analysis result explanation area 527. Each item will be explained. In this connection, the meaning of specific numeric values displayed in each item and a relation between numbers will be explained in FIGS. 6 and 7. How to calculate numbers in each item will be explained in connection with a processing flow of FIGS. 12 to 24.

(5-1) The bottleneck analysis result area 515 has an original multiplicity set value 516 as a multiplicity originally set by a multiplicity adjustment agent before bottleneck analysis, an original upper limit request generation rate 517 as a request generation rate calculated from the original multiplicity set value 516, an actual request generation rate 519 as a request generation rate obtained after the bottleneck analysis using actually measured values, and an actually necessary multiplicity 518 as a necessary multiplicity calculated from the actual request generation rate 519.

(5-2) The influence analysis result area 520 has an after-modification multiplicity set value 521 (which is automatically set when "automatic" is selected in a multiplicity modification method 534 (to be later explained) and which is entered by the user when "manual" or "enforcement" is selected) as a multiplicity modified after the bottleneck analysis; an after-modification upper limit request generation rate 522 as a request generation rate calculated from the after-modification multiplicity set value 521; a current estimated request generation rate 524 after recalculation (details of which will be explained in FIG. 21) as a current request generation rate obtained as a result of the influence analysis considering a request newly taken in due to the multiplicity modification; a current necessary multiplicity 523 after recalculation as a necessary multiplicity calculated from the current estimated request generation rate 524 after recalculation; a future estimated request generation rate 526 after recalculation (details of which will be explained in FIG. 21) as a request generation rate which is obtained after influence analysis considering taken in in future due to multiplicity modification and which is estimated to possibly increase in future and reach the value; and a future necessary multiplicity 525 after recalculation as a necessary multiplicity calculated from the future estimated request generation rate 526 after recalculation.

(5-3) The analysis result explanation area 527 has a state 528 indicative of whether or not the request can be processed with the multiplicity set value; a guide 529 indicative of how to cope with a situation when the multiplicity set value is insufficient or the insufficient multiplicity set value is estimated; and a reason 530 indicative of a reason why it led to determination of the state 528 or the guide 529. As a message given in the state 528, three patterns of "multiplicity is currently sufficient", "multiplicity is currently insufficient", and "multiplicity may become insufficient in future" are considered. As a message given in the guide 529, three patterns of "increase the multiplicity set value", "scale-out", and "scale-up" are considered.

Since a result of the influence analysis of the guarantee DB led to the fact that the multiplicity is currently sufficient but may become insufficient in future in the example of FIG. 5, the fact is displayed on the analysis result explanation area 527. A notification level "WARNING" is displayed in the uppermost row of the analysis result display area 514. If the multiplicity is lack even in this stage, the notification level of "ERROR" appears; whereas, if the multiplicity is sufficient, then the notification level of "OK" appears.

As mentioned above, from the analysis result display area 514, the user can compare the current and ideal value of the multiplicity set value, necessary multiplicity, and request generation rate of each element; and use it as reference information on the multiplicity design. This results in assisting the user in the design work of deriving an optimum parameter value. Further, the user can determine whether or not the derived parameter value is employed based on the trade-off between the cost of resource expansion and the performance security.

(6) Included in the multiplicity modify/change area 531 are a multiplicity modify button 532 to be clicked when the operator wants to execute the multiplicity modification process (Step 203 in FIG. 2); a multiplicity change button 533 to be clicked when the operator wants to execute the multiplicity change process (Step 205 in FIG. 2); a radio button 534 for selecting one of "automatic", "manual", and "enforcement" as a method for executing the multiplicity modification process; and a radio button 535 for selecting one of "automatic" and "manual" as a method for executing the multiplicity change process.

When the operator selects "automatic" by the radio button 534 for multiplicity modifying method, this causes the actually necessary multiplicity 518 to be automatically input in the text area 521. Thus the operator can save a labor of entering a modified value for the multiplicity for each element. Further, since a new server introduction cost is high or a system formation period is long in an actual situation, it is impossible in some cases to change the multiplicity of an element as a bottleneck to a value beyond the necessary multiplicity. In this case, by selecting "enforcement" by the radio button 534 of multiplicity modification method and entering a multiplicity set value smaller than the necessary multiplicity in the text area 521, the element having the multiplicity set therefor can also be treated as an element not to be subjected to the influence analysis.

From the multiplicity modify/change area 531, the operator/administrator of the monitored system can select the multiplicity modify or change method for each element, reduce his/her design work load, and dynamically redistribute server resources in real time. Further, he/she can determine whether or not to employ the derived parameter value based on the trade-off between the resource expansion cost and the performance security. In addition, he/she can manually determine the parameter value when failing to derive an optimum parameter value.

Shown in FIG. 6 is the cooperation display area 513 (see FIG. 5) after the bottleneck analysis process (Step 202 in FIG. 2) is carried out. More specifically, FIG. 6 shows details of the cooperation display area 513 when the self-supporter guarantee instance 423 is a bottleneck in the bank system of FIG. 4.

The cooperation display area 513 first displays a bank system cooperation view 6701. On the bank system cooperation view 6701, cooperation arrows extended from a financing system icon 6705 and a sales office system icon 6707 to a security & guarantee system icon 6708 are shown by thick lines, and the security & guarantee system icon 6708 is shown to be surrounded by a double line. This means that the security & guarantee system 405 is a bottleneck.

In order to examine one of elements in the security & guarantee system 405 forming a bottleneck, next, the operator selects the security & guarantee system icon 6708 (by double-clicking the mouse on it), this causes the current screen to be transited to a security & guarantee system cooperation display view 6702. This view 6702 displays the cooperative relations between sub-systems of the bank system (the cooperation display area 513 in FIG. 5 also showing relations between such sub-systems). Since the guarantee server icon 6714 is shown by a double line in the security & guarantee system, this means that the guarantee server 414 (FIG. 4) is a bottleneck.

Information included in a guarantee server icon 601 for the guarantee server icon 6714 refers to the fact that the original upper limit request generation rate is 250 (requests/sec), the original multiplicity set value is 13, the actual request generation rate is 320 (requests/sec), and the actual necessary multiplicity is 16 (the information also being shown in the bottleneck analysis result area 515 in FIG. 5). Since a relation of (original analysis result)<(actual necessary multiplicity) (i.e., 13<16) is satisfied in this example, the operator can see the fact that the guarantee server 414 fails to fully process all the requests. When a pop-up hint 602 is displayed for the state of the guarantee DB 427, further, this means to satisfy a relation of (original multiplicity set value)>(actual necessary multiplicity) (or 17>13). From this, the operator can see the fact that the guarantee DB 427 can fully process the requests. When a pop-up hint 603 is displayed, this means that (original multiplicity set value)>(actual necessary multiplicity) (or 15>13). Thus the operator can see the fact that the guarantee DB 427 can fully process the requests. A difference between the two exemplary cases will be explained in FIG. 7.

When a parent element positioned at an upper layer level of the bottleneck element is displayed to be highlighted in this way, the present system can know a location where a problem (bottleneck) occurred from macroscopic viewpoint and this can assist the operator in his/her design work.

For the purpose of examining one of elements in the guarantee server 414 as a bottleneck, the operator selects the guarantee server icon 6714 (by double-clicking the mouse on it). This causes the cooperation display area 513 for a guarantee process 415 (FIG. 4) at a lower layer level of the guarantee server to appear (not shown in FIG. 6). Selection of the guarantee process 415 causes the view to be transited to a guarantee process view 6703.

In the guarantee process view 6703, cooperation arrows extended from both threads of a guarantee inquiry thread icon 6715 and a guarantee registration thread icon 6717 to a self-supporter guarantee instance icon 6718 are shown by thick lines, and the self-supporter guarantee instance icon 6718 is shown by a double line. This means that the self-supporter guarantee instance 423 (FIG. 4) is a bottleneck. Though not shown in FIG. 6, when the original multiplicity set value 516 of "5" and the actually necessary multiplicity 518 of "9" are shown as an example in the analysis result display area 514 (FIG. 5) of the self-supporter guarantee instance 423, a relation of (original multiplicity set value 516)<(actually necessary multiplicity 518) is satisfied. From this, the operation can know the fact that the self-supporter guarantee instance 423 cannot fully process the requests.

From a message of "State: Bottleneck occurred" in a pop-up hint 604, the operator can see the fact that the self-supporter guarantee instance 423 is an element which causes the bottleneck. From a message of "Guide: Increase the multiplicity" and a message of "Reason: CPU/memory both sufficient", the operator can know the fact that he/she can get rid of the bottleneck with the load on the guarantee server 414 and the memory system cache being kept stable (in a range of critical multiplicity), by increasing the multiplicity set value of the self-supporter guarantee instance 423.

In this way, since the bottleneck analysis result is displayed on the screen for easy understanding of the detailed state of the problem (bottleneck), this can advantageously assist the operator in his design work.

With respect to the memory system cache, it can be analyzed by a method similar to a flow of load analysis process of the server to be explained later in FIG. 17. Not only the CPU time or the memory system cache but also another parameter (the number of IO times or the like) having a model similar to these can also be analyzed by a method similar to the method shown in FIG. 17.

In order to examine one of elements in the self-supporter guarantee instance 423 forming a bottleneck, finally, the operator double-clicks the mouse on the self-supporter guarantee instance icon 6718. This causes the view to be transited to a self-supporter guarantee instance cooperation display view 6704. On the view display 6704, a self-supporter registration AP icon 6720 is shown by a double line, which means that the self-supporter registration AP 426 (FIG. 4) is a bottleneck. However, a multiplicity cannot be set directly for an element of a business AP level. Accordingly, the bottleneck is gotten rid of, actually by adjusting the set multiplicity of the self-supporter guarantee instance 423 as the parent element of the self-supporter registration AP 426.

As has been mentioned above, the system operator/administrator can see the analysis result by gradually breaking down the problem from macroscopic viewpoint to microscopic viewpoint; that is, by sequentially displaying the security & guarantee system cooperation display view 6702, the guarantee process view 6703, and the self-supporter guarantee instance cooperation display view 6704 sequentially from the bank system cooperation view 6701 as the cooperation display area 513 of the uppermost layer level, that is, by sequentially displaying system elements of lower layer levels and their states on the cooperation display area 513 (FIG. 5). For this reason, the operator can advantageously take a measure to secure the performance of the entire system efficiently from broad viewpoint and can reduce a frequency of try and error for system tuning based on multiplicity.

FIG. 7 shows the cooperation display area 513 after the influence analysis process (Step 204 in FIG. 2) is carried out. In FIG. 7, explanation will then be made in detail as to how the respective cooperation display view (6701 to 6704) of FIG. 6 change, on the assumption that the multiplicity lack (view example in FIG. 6) of the self-supporter guarantee instance 423 which was known by the bottleneck analysis is solved by increasing the multiplicity set value, and that then, as a result of influence analysis, it becomes obvious that a multiplicity lack takes place in the guarantee DB 427.

The guarantee process view 6703, first of all, shows a state after "5" for the original multiplicity set value of the self-supporter guarantee instance 423 (the original multiplicity set value 516 having "5" and the actually necessary multiplicity 518 having "9" in the example of FIG. 6) decided as a bottleneck in FIG. 6 is modified to "10", and then the influence analysis process (Step 204 in FIG. 2) is carried out. From this view, the operator can know the fact that the self-supporter guarantee instance 423 got ready for sufficiently processing the request, since "10" for the after-modification multiplicity set value 521 after the modification as well as "9" for the current necessary multiplicity 523 after recalculation are displayed on the influence analysis result area 520, and since a relation of (multiplicity set value after modification)>(current necessary multiplicity after recalculation) is satisfied. The operator also can know the fact that the bottleneck caused by the self-supporter guarantee instance 423 was gotten rid of, from a message saying "state: bottleneck gotten rid of" in a pop-up hint 704. The double line of the self-supporter guarantee instance icon 6718 disappears. Even on the self-supporter guarantee instance cooperation display view 6704 after the influence analysis process, the double line of the self-supporter registration AP icon 6720 indicating a bottleneck also disappears. Accordingly, the operator can know the fact that it can get ready for sufficiently processing the request.

When the influence analysis result is displayed on the screen in this way, the operator can easily understand the problem (bottleneck) solving state and thus this can assist the operator in his/her design work.

The security & guarantee system cooperation display view 6702 shows a state of the security & guarantee system after the influence analysis process is carried out on the guarantee process view 6703. On the screen, the double line of the guarantee server icon 6714 indicating a bottleneck already disappears. From the pop-up hint 701 for the guarantee server icon 6714, the operator can know the fact that the guarantee server 414 can sufficiently get ready for processing the request, since a relation of (multiplicity set value after modification)>(current necessary multiplicity after recalculation) (18>16) is satisfied.

The state of the guarantee DB 427 is divided into two cases as shown in pop-up hints 702 and 703. In any case, the guarantee DB icon 6721 is surrounded by a double line, indicating the possibility of a new bottleneck. The pop-up hint 702 corresponds to the case of the pop-up hint 602 in FIG. 6, while the pop-up hint 703 corresponds to the case of the pop-up hint 603 in FIG. 6.

(1) In the case of the pop-up hint 702, "17" for the original multiplicity set value 516 and "16" for the current necessary multiplicity 523 after recalculation are displayed on the analysis result display area 514 based on numeric values included in the pop-up hint 701 and the pop-up hint 602, though not shown. Since a relation of (original multiplicity set value)>(current necessary multiplicity after recalculation) is now satisfied, the operator can know the fact that the guarantee DB 427 can get ready for sufficiently process the request for the time being. However, since "17" for the original multiplicity set value 516 and "18" for the future actual necessary multiplicity 525 after recalculation are displayed, the operator can see the fact that a relation of (original multiplicity set value)<(future actual necessary multiplicity after recalculation) is satisfied and thus the guarantee DB 427 may not be able to process the request in future.

The "Notification level: WARNING" in the pop-up hint 702 means that the request can now be process but may not be able to be processed in future. From a message "State: Future connection lack", the operator can know the fact the guarantee DB 427 may become an element which causes a new bottleneck. From a message of "Guide: Increase the number of nodes for DB server" and a message of "Reason: Insufficient in CPU performance", the operator can realize that if the number of nodes (the number of servers) for the guarantee DB 427 is not increased, then the bottleneck cannot be gotten rid of in future with the stable load on the guarantee DB 427 being kept (that is, in a range of critical multiplicity).

(2) In the case of the pop-up hint 703, "15" for the original multiplicity set value and "16" for the current necessary multiplicity 523 after recalculation are displayed on the analysis result display area 514 of the guarantee DB 427 on the basis of numeric values included in the pop-up hint 701 and the pop-up hint 603 though not shown. A relation of (original multiplicity set value)<(current necessary multiplicity 523 after recalculation) is now satisfied. Therefore, the operator can know the fact that, when the multiplicity set value of the self-supporter guarantee instance 423 is increased for the state of multiplicity lack of the self-supporter guarantee instance 423, the guarantee DB 427 will not able to process the request.

The "Notification level: ERROR" in the pop-up hint 703 means that increasing the multiplicity set value of the self-supporter guarantee instance 423 without any measure taken results in that the guarantee DB 427 will not be able to process the request. The "State: Connection lack!" means that the guarantee DB 427 may become an element which causes a new bottleneck. From the messages "Guide: Increase the number of nodes for DB server" and "Reason: Insufficient in CPU performance", the operator can know the fact that the load on the guarantee DB 427 cannot be kept stable without increasing the number of nodes (the number of servers) for the guarantee DB 427.

When influence analysis result is displayed on the display view in this way, the operator can get easy understanding of the detailed state of a newly generated problem (bottleneck) and this can assist the operator in his design work.

Finally, the bank system cooperation view 6701 shows the state of the bank system after influence analysis process. Since the security & guarantee system icon 6708 is now surrounded by the double line, the operator can know the still existence of the bottleneck. This is, as mentioned above, because it has been decided, through the influence analysis after the multiplicity modification of the self-supporter guarantee instance 423, that the guarantee DB 427 may fail to fully process the request.

FIG. 8 shows a system configuration of the monitored system 107 (more specifically, the bank system 401), having the inter-system arrangement definition 329 and the sub-system internal arrangement definition 316 (both shown in FIG. 3).

The inter-system arrangement definition 329 includes a system arrangement definition 801 as a table for storing arrangement information about the system (bank system 401 in FIG. 4) and a sub-system relation 802 as a table showing a relation from the system arrangement definition 801 to a sub-system arrangement definition 803 (included in the sub-system internal arrangement definition 316).

The sub-system internal arrangement definition 316 has 5 types of arrangement definition tables and 4 types of relation tables.

The 5 types of arrangement definition tables are (1) the sub-system arrangement definition 803 as a table for storing arrangement information about sub-systems (the financing system 402, interest rates system 403, sales office system 404, and security & guarantee system 405 in FIG. 4); (2) a server arrangement definition 805 as a table for storing arrangement information about servers (the load balancer 406, security Web 407, security server 408, guarantee DB 409, guarantee Web 411, guarantee server 414, and guarantee DB 427 in FIG. 4); (3) a process arrangement definition 807 as a table for storing arrangement information about processes (the guarantee HTTP daemon 412, guarantee process 415, and guarantee DBMS 428 in FIG. 4); (4) a component arrangement definition 809 as a table for storing arrangement information about components (the guarantee inquiry thread 416, guarantee registration thread 419, employment income earner guarantee instance 417, and self-supporter guarantee instance 423 in FIG. 4) (in which 'component' is a general term for the conception of an execution unit smaller than a process such as thread or instance); and (5) a business AP arrangement definition 811 as a table for storing arrangement information about business APs (the registration AP 420, self-supporter inquiry AP 424, and self-supporter registration AP 426 in FIG. 4).

The 4 types of relation tables are (1) a server relation 804 as a table showing a relation between the sub-system arrangement definition 803 and the server arrangement definition 805; (2) a process relation 806 as a table showing a relation between the server arrangement definition 805 and the process arrangement definition 807; (3) a component relation 808 as a table showing a relation between the process arrangement definition 807 and the component arrangement definition 809; and (4) a business AP relation 810 as a table showing a relation between the component arrangement definition 809 and the business AP arrangement definition 811.

For the guarantee process 415 (a children component having four of the guarantee inquiry thread 416, guarantee registration thread 419, employment income earner guarantee instance 417, and self-supporter guarantee instance 423 in FIG. 4) as one of elements stored in the process arrangement definition 807, for example, the component relation 808 from the process arrangement definition 807 to the component arrangement definition 809 will be explained in more detail. When component name (ID) is 'guarantee inquiry thread 416', a cooperation originator component list is 'guarantee HTTP daemon 412' and a cooperation destination component list is 'employment income earner guarantee instance 417' and 'guarantee registration thread 419'. The 'cooperation originator component' as used therein means a component from which an arrow is directed to a component designated by a component name in FIG. 4; and the 'cooperation destination component' means a component to which an arrow is directed from a component designated by a component name in FIG. 4. When the cooperation originator has no definition information of component level, it has process information of upper layer level.

Information included in a multiplicity modifying method 814, etc. stored in each arrangement definition table is referred to in the multiplicity modification process (Step 203 in FIG. 2). More specifically, in Step 1801 in FIG. 18 to be explained later, the information is referred to as a multiplicity modifying method 1804. Similarly, information included in a multiplicity modifying method 815 stored in each arrangement definition table is referred to in the multiplicity change process (Step 205 in FIG. 2). More specifically, the information is referred to as a multiplicity modifying method 2306 in Step 2301 in FIG. 24 to be explained later. Accordingly, this can assist the operator/administrator of the monitored system in lightening his/her operation load and in his/her design work of deriving an optimum system arrangement and parameter values so as to realize compatibility between the performance security and the system running stability.

Further, since a link to an agent information 908 is established from the component arrangement definition 809, the multiplicity adjustment agents 110 and 112 (FIG. 1) can be identified and server resources can be dynamically redistributed advantageously.

FIG. 9 shows a data structure of details of history and definition information. The data structure includes a request path definition 918 for defining how a request goes through sub-systems; acquired measured-value transmission/reception definitions 303 and 308 for defining what request information of the request measurement modules 302 and 307 (FIG. 3) to be acquired (FIG. 3); and a multiplicity setting meta definition 317 for defining which item of the multiplicity definition 311 of its own element and the multiplicity definition 311 of its own element storing the multiplicity set value and a queue length set value corresponding to the multiplicity set value and the queue length set value.

The request path definition 918 includes 4 tables, that is, a request path identify definition 901 as a table for storing information for identification of a request path; a cooperation destination arrangement element information 903 as a table for storing information (such as order, frequency and divergence condition) when the request goes through a component; a request path performance information 904 as a table for storing performance information (critical multiplicity, average response, and critical CPU time of each server in the critical multiplicity) for each request path; and an element relation 902 as a relation table from the definition 903 to the definition 904. In this case, as shown in FIG. 9, a link is provided from each table to each table in the sub-system internal arrangement definition 316 (FIG. 8). The word "critical CPU time" as used herein refers to a server CPU time for a critical multiplicity.

Figure 19:
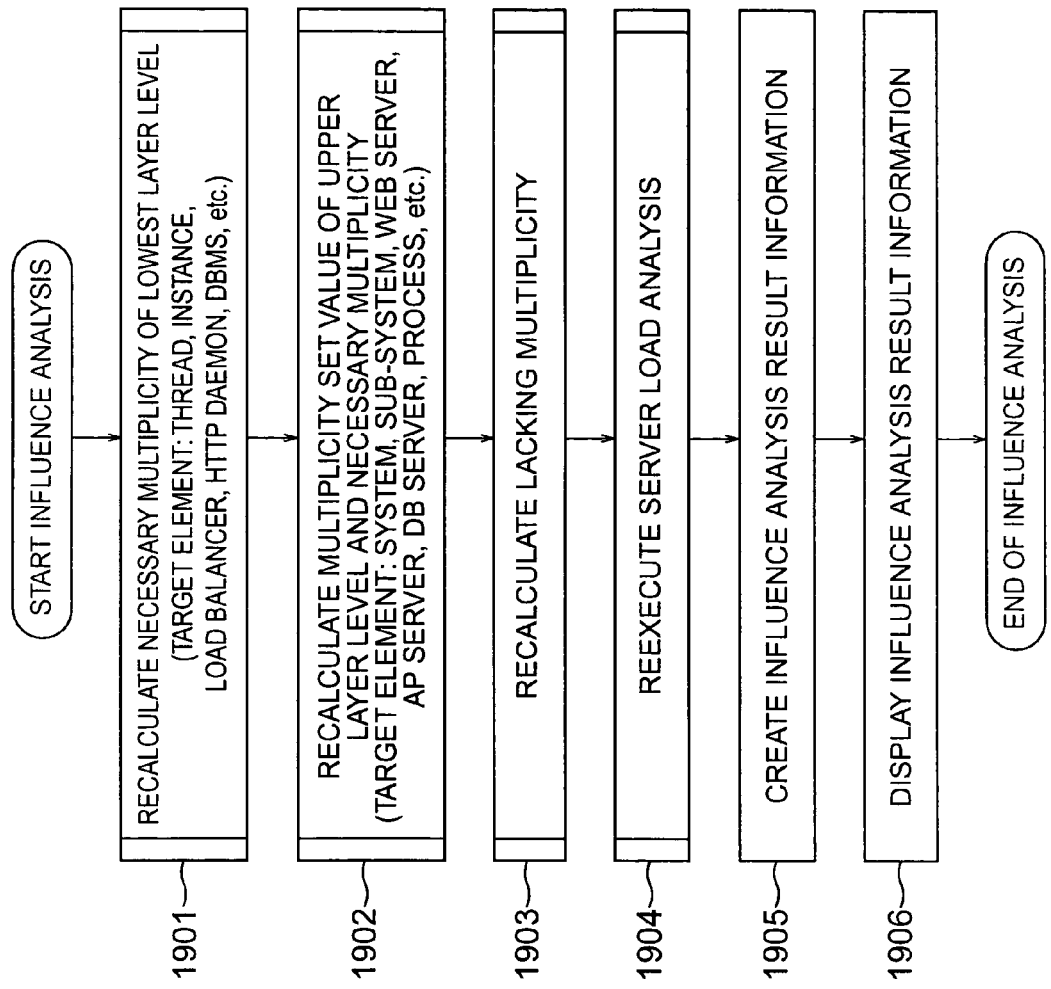
FIG. 19 is a flowchart showing a summary of an influence analysis process.

The cooperation destination arrangement element information 903 includes a cooperation order 911 and a cooperation condition 912 as attributes. Based on the attributes, the operator can know that the request for each request path goes through which component in what order and how many times. For a branch, further, the operator can know the branch takes place in what condition and frequency. In this way, this can assist the operator in his design work of deriving optimum parameter values. The request path performance information 904 has critical parameters (including critical memory system cache, and critical IO generation rate) such as a critical multiplicity 1707, an average response 1414 and a critical CPU time 1708 as attributes. For the definition of such parameters and how to use these, refer to FIG. 17. Based on such parameters, the operator can see the request generation rate and derive parameter values optimum for the server load analysis process 1304 (FIG. 13) or the load analysis reexecution process 1904 (FIG. 19).

The acquired measured-value transmission/reception definitions 303 and 308 for acquisition of an actually measured value has three tables, that is, an actually measured value 905 as a definition table for designating information to identify the actually measured value obtained by one of the multiplicity adjustment agents 110 and 112 (FIG. 1); request information 906 as a definition table for designating information to identify a request path; and message information 907 as a definition table for designating information to uniquely identify the request information. The request measurement modules 302 and 307, individual sub-system's measured-value collection module 312, and measured value collection module 322, shown in FIG. 3 measure, collect, sort and merge actually measured values on the basis of information stored in the acquired measured-value transmission/reception definitions 303 and 308.

As shown in FIG. 9, the actually measured value table 905 includes an agent name (ID) 913 for identifying one of the multiplicity adjustment agents 110 and 112 which measured the actually measured value. The request information table 906 includes a request path name (ID) 914 for identifying the request path of the request. The message information table 907 includes a transaction identifier (ID) 915 for linking a plurality of pieces of request information measured by a plurality of elements into a single piece of information, a time band 916 as an item for sorting information according to each acquisition time band, and a message type 917 as an item for discriminating between untransmitted, unprocessed, and processed. The above items can assist the operator in his/her design work of deriving optimum parameter values.

The multiplicity definition 311 includes two tables; that is, agent information 908 as a table for storing information about identification between the multiplicity adjustment agents 110 and 112, and multiplicity information 909 as a table for storing information necessary for carrying out the simultaneous executable multiplicity control process and the load balance process. The multiplicity information table 909 includes information which is used when the multiplicity control modules 301 and 305 carry out the simultaneous executable multiplicity control process and the load balance process. Based on such information, the system can automatically redistribute server resource in real time while securing the server running stability.

Last, the multiplicity setting meta definition 317 is made up of two tables; that is, agent information 908 as a table for storing information for identification between the multiplicity adjustment agents 110 and 112, and multiplicity set item information 910 as a table for storing information for identification between various set parameter items. The multiplicity change instruction module 315 (FIG. 3) instructs to change a multiplicity set value on the basis of information included in the multiplicity setting meta definition 317 (Step 2305 in FIG. 24 to be explained later).

Figure 10:
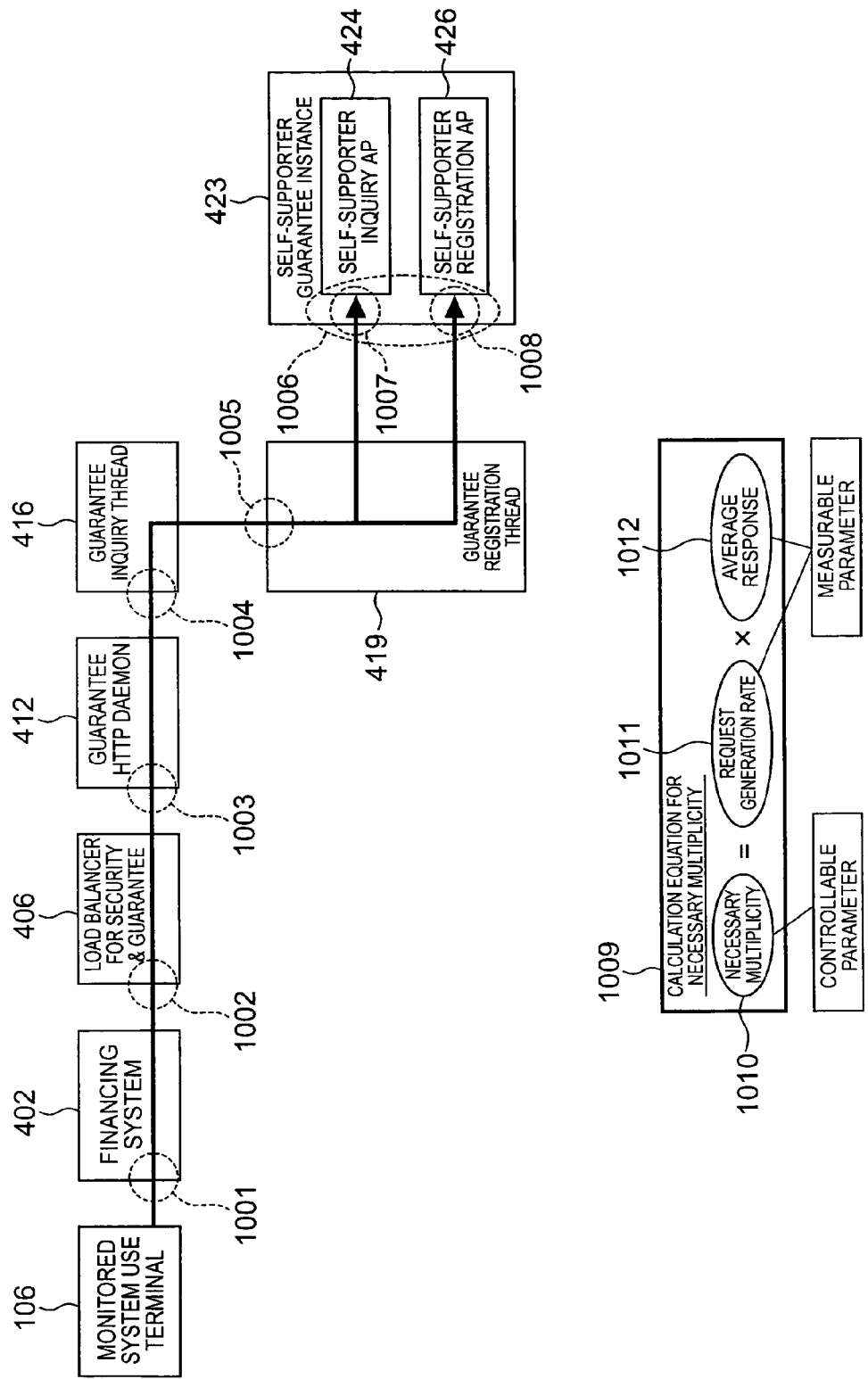
FIG. 10 shows a relation between a request generation rate and a system element.

FIG. 10 is a diagram for explaining a relation between a request generation rate and a system element. A necessary multiplicity 1010 for a request having a request path can be expressed in accordance with a calculation equation 1009, (request generation rate 1011)×(average response 1012), shown in FIG. 10. The necessary multiplicity 1010 is a parameter controllable by an element, while the request generation rate 1011 and the average response 1012 are parameters measurable by an element. Accordingly, by measuring the request generation rate 1011 for each element and the average response 1012 therefor, the necessary multiplicity 1010 can be decided and the simultaneous executable multiplicity of each element can be controlled using the necessary multiplicity 1010. The average response 1012 is an average stay-in time for a request in each element, which can be calculated by measuring a stay-in time in each element.

A request having a request path has such a path characteristic as shown in FIG. 10. That is, the request goes through the monitored system use terminal 106 (browser)→load balancer 406→guarantee HTTP daemon 412→guarantee inquiry thread 416→guarantee registration thread 419 self-supporter inquiry AP 424 in the self-supporter guarantee instance 423→self-supporter registration AP 426 in the instance 423, in this order. And when the contents of a message of the request is normal and no error return occurs in the middle of the go-through path, the request generation rate 1011 has the same value even when measured at any of request measurement points 1002 to 1005, 1007 and 1008 of each element in FIG. 10.

When as for the measurement point 1006, the request goes through the same element (self-supporter guarantee instance 423) twice in the first-time request process, a value corresponding to double of the request generation rate 1011 measured at another measurement point is the same as the request generation rate 1011 measured at the measurement point 1006. Conversely, a value obtained by dividing the request generation rate 1011 measured at the measurement point 1006 by 2 is the same as the request generation rate 1011 measured at another measurement point. In this way, when the request goes through the same element a plurality of times in the first-time request process, the request generation rates of elements can be mutually converted by multiplying or dividing the request generation rate of the element by the go-through frequency of each element. In other words, the request generation rate 1011 can be converted to a parameter commonly usable to elements.

Accordingly, with respect to a request for which an error return occurred by the multiplicity control function of the multiplicity control modules 301 and 305 of the multiplicity adjustment agents 110 and 112 in the middle of the request path; the number of requests (i.e., the request generation rate 1011) to be originally processed in each element when the request is assumed to have been normally processed without any error return, can be calculated. And from the calculated request generation rate 1011 and the average response 1012, the necessary multiplicity 1010 for each element can be calculated using the calculation equation 1009 for necessary multiplicity.

When some transaction error in the middle of the request path causes a request to be returned or when there are a plurality of patterns of paths through which the request goes by a branch, an error return rate or a branch rate can be calculated from the past history or a previous estimated value to calculate a request generation rate in each element. For example, (request generation rate measured in an element having the request therein) becomes equal to (request generation rate measured in the request generation originator)×(rate at which the request goes through the element).

Figure 11:
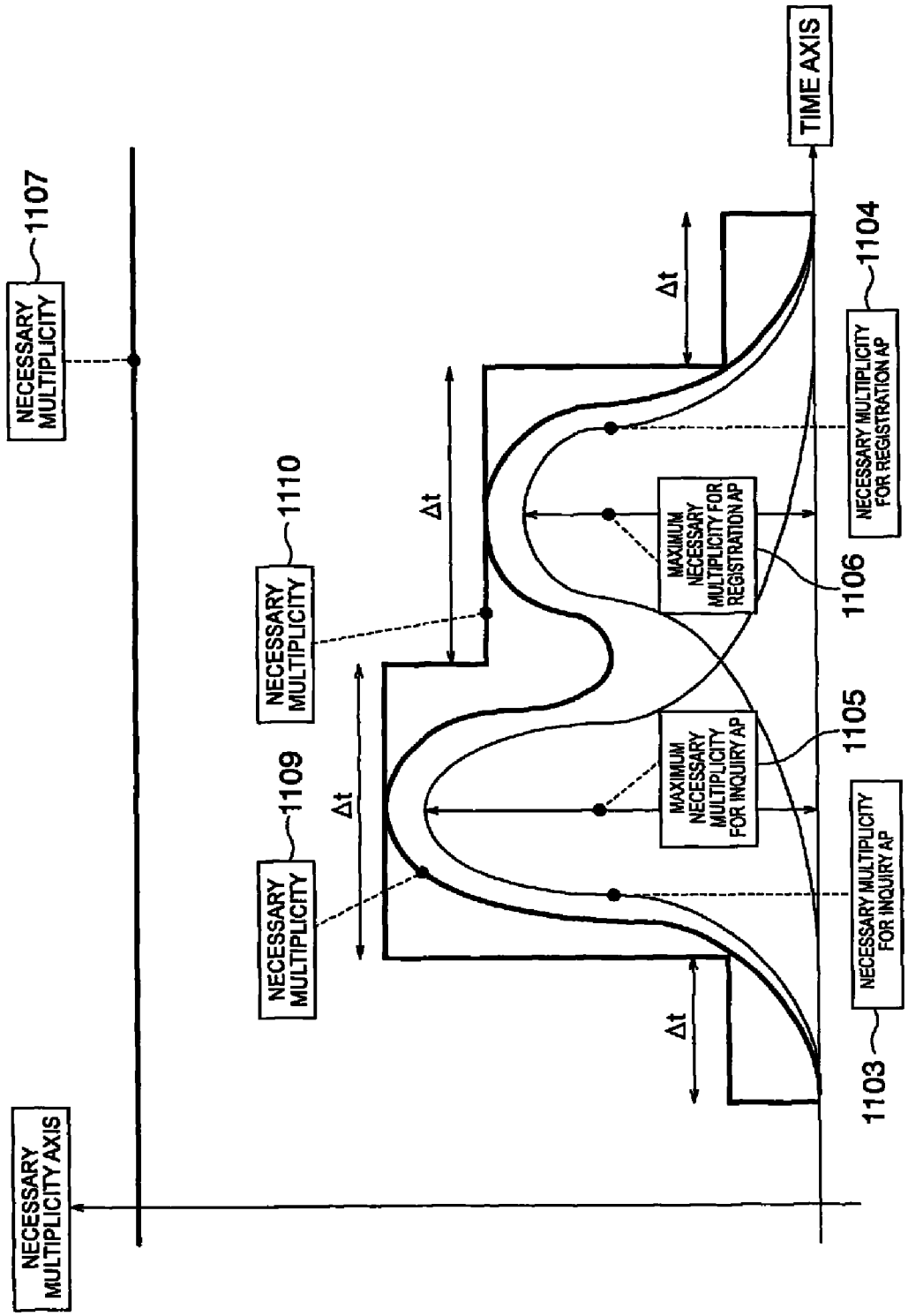
FIG. 11 shows a variation in the necessary multiplicity of an application with time.

FIG. 11 shows an example of how to efficiently derive a necessary multiplicity. In FIG. 11, the abscissa is a time axis 't' and the ordinate is a necessary multiplicity axis. FIG. 11 shows variations with time in a necessary multiplicity a(t) 1103 for the self-supporter inquiry AP 424 (FIG. 4) and in a necessary multiplicity b(t) 1104 for the self-supporter registration AP 426 (FIG. 4).

When no consideration is paid to time changes in the request generation rates of the inquiry AP 424 and the registration AP 426, a necessary multiplicity 1107 as a sum of maximums 1105 and 1106 necessary for the respective business APs becomes a necessary multiplicity for the self-supporter guarantee instance 423. However, a multiplicity as large as the necessary multiplicity 1107 is not necessary even at any time, as shown in FIG. 11. Thus the necessary multiplicity 1107 is not such a necessary multiplicity as to efficiently use system resources. For this reason, considering variations in the necessary multiplicities of the inquiry AP 424 and the registration AP 426, a necessary multiplicity is varied with time for each time interval $\Delta t$. In other words, (maximum of a(t) for $\Delta t$)+(maximum of b(t) for the $\Delta t$) is used as a necessary multiplicity. When $\Delta t$ is now taken as shown in FIG. 11, the necessary multiplicity of the self-supporter guarantee instance 423 becomes such a graph as shown by 1110. When $\Delta t \to 0$, the necessary multiplicity becomes such a graph as shown by 1109.

When a request generation rate for each time band is measured and the calculation equation 1009 for necessary multiplicity or a generation rate upon branch is calculated in this way, resources under a mixed business environment can be effectively used.

FIGS. 12 to 24 show detailed processing flows of the measured-value collection process (Step 201), bottleneck analysis process (Step 202), multiplicity modification process (Step 203), influence analysis process (Step 204), and multiplicity change process (Step 205) in FIG. 2. In description given in the following, "system element of lowest level" refers to thread, instance, load balancer, HTTP daemon or the like among elements in FIG. 3. Meanwhile, "system element of upper layer level" refers to a system element (more specifically, system, sub-system, web server, AP server, DB server, process or the like) which can indirectly perform the multiplicity control process or the load balance process by adding multiplicity set values or request generation rates of the system elements of lowest level. An element for transmitting a request directly to another element is referred to as "upper tier element", whereas, an element for receiving a request directly from another element is referred to as "lower tier element".

Figure 12:
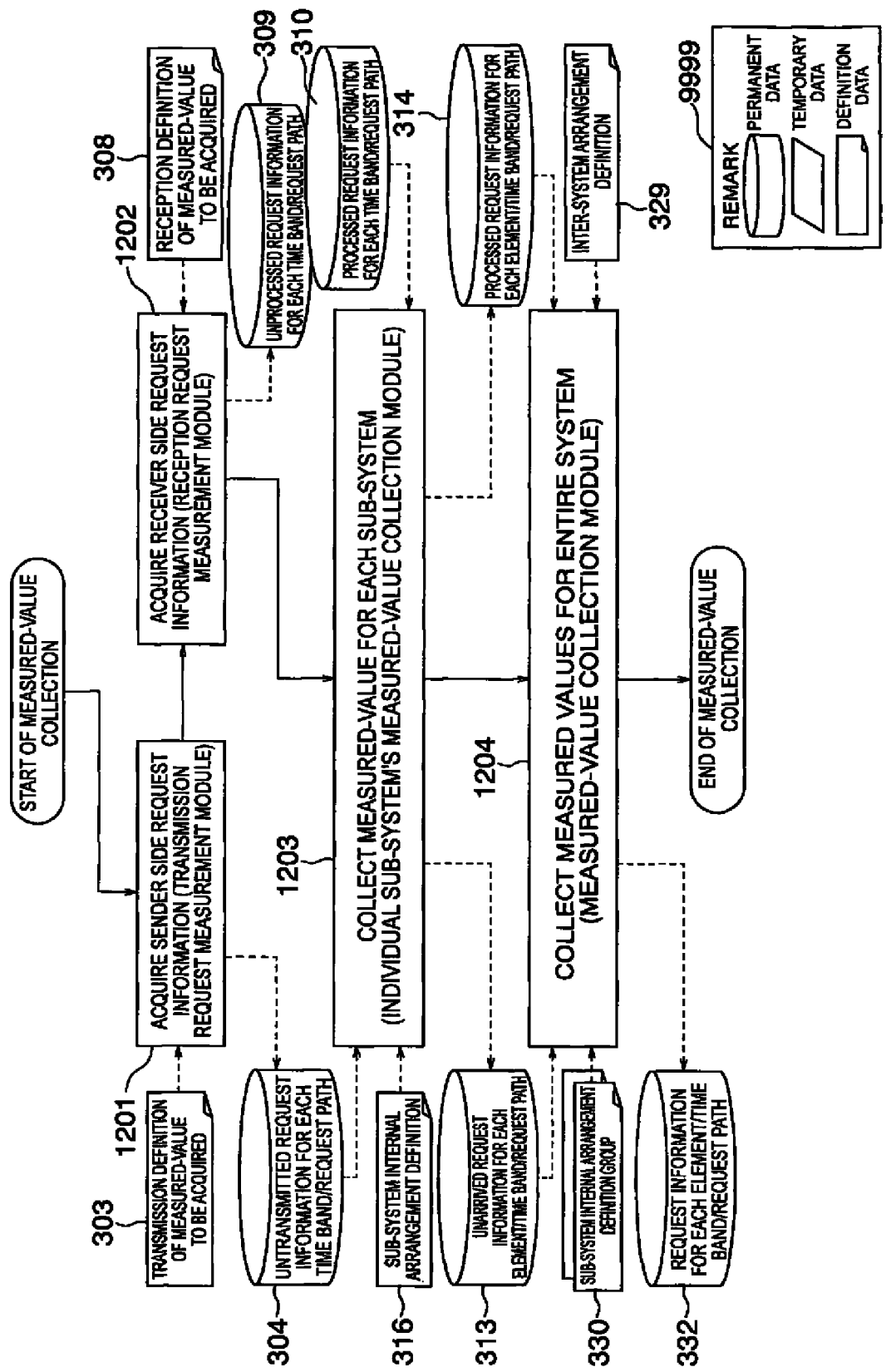
FIG. 12 is a flowchart showing details of flows of an actually-measured value collection process.

FIG. 12 is a detailed flowchart of the measured-value collection process (Step 201 in FIG. 2). In respective steps in FIG. 12, the definition information and request information shown in FIG. 3 will be appropriately referred to.

The transmission request measurement module 302 of the multiplicity adjustment agent 110 first acquires transmission side request information (Step 1201). More in detail, the transmission request measurement module 302, on the basis of the transmission definition 303 for an actually measured value to be acquired, acquires untransmitted request information, sorts the acquired information according to each time band/request path, and stores the sorted information in the untransmitted request information 304 for each time band/request path.

The reception request measurement module 307 of the multiplicity adjustment agent 112 then acquires reception side request information (Step 1202). More in detail, the reception request measurement module 307, on the basis of the reception definition 308 for an actually measured value to be acquired, acquires unprocessed request information, sorts the acquired information according to each time band/request path, and stores the sorted information in the unprocessed request information 309 according to each time band/request path. The reception request measurement module 307, on the basis of the reception definition 308 for an actually measured value to be acquired, acquires processed request information, sorts the acquired information according to each time band/request path, and stores the sorted information in the processed request information 310 according to each time band/request path.

Steps 1201 and 1202 may be executed concurrently, or be executed at the same time or be executed in random order sequentially.

Next, the individual sub-system's measured-value collection module 312 of the individual sub-system's multiplicity adjustment server 105 collects an actually measured value for each sub-system (Step 1203). More specifically, the individual sub-system's measured-value collection module 312, on the basis of the sub-system internal arrangement definition 316, collects the untransmitted request information 304 for each time band/request path and the unprocessed request information 309 for each time band/request path from the multiplicity adjustment agents 110 and 112 of each element, sorts the collected information according to each element, merges it, and stores such information in the unarrived request information 313 according to each element/time band/request path. The individual sub-system's measured-value collection module 312, on the basis of the sub-system internal arrangement definition 316, collects the processed request information 310 for each time band/request path from the multiplicity adjustment agent 112 of each element, sorts the collected information according to each element, and stores the sorted information in the processed request information 314 according to each element/time band/request path.

Finally, the measured value collection module 322 of the integrated multiplicity analysis server 104 collects actually measured values of the entire system (Step 1204). More specifically, the measured value collection module 322, on the basis of the sub-system internal arrangement definition group 330 and the inter-system arrangement definition 329, collects the unarrived request information 313 for each element/time band/request path from the individual sub-system's multiplicity adjustment server 105 of each sub-system, and stores the collected information in the request information 332 according to each element/time band/request path in the integrated multiplicity analysis server 104.

Figure 13:
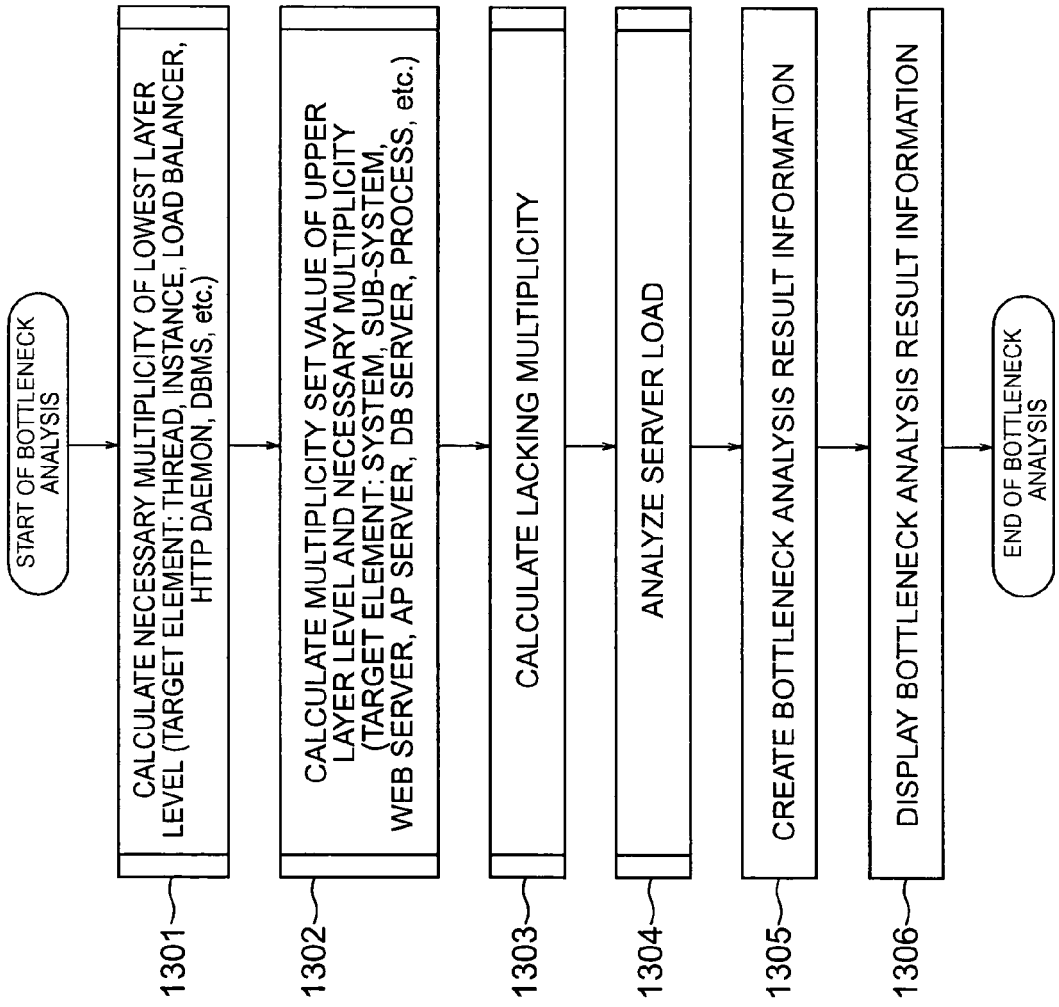
FIG. 13 is a flowchart showing a summary of bottleneck analysis process.

FIG. 13 is a flowchart showing a summary of the bottleneck analysis process (Step 202 in FIG. 2). The bottleneck analysis process is carried out by the bottleneck analysis module 321 of the integrated multiplicity analysis server 104 (FIG. 3).

On the basis of request information of each element and its upper tier element, the bottleneck analysis module first calculates a necessary multiplicity for each element of lowest level and each time band (Step 1301), details of which will be explained later in FIG. 14. On the basis of a multiplicity set value and the necessary multiplicity of the element of lowest level, the bottleneck analysis module calculates, according to each layer, a multiplicity set value and necessary multiplicity of each element of upper layer level and for each time band (Step 1302), details of which will be explained later in FIG. 15. Next, the bottleneck analysis module compares the multiplicity set value and the necessary multiplicity and calculates a multiplicity lacking for each element and each time band (Step 1303), details of which will be explained later in FIG. 16. The bottleneck analysis module next calculates a load state for each server/time band from the necessary multiplicity and a critical multiplicity, and analyzes a power lacking server and a power lacking time band (Step 1304), details of which will be explained later in FIG. 17. From the sub-system internal arrangement definition group 330, inter-system arrangement definition 329, and bottleneck analysis result, the module creates bottleneck analysis result information for each layer/time band (Step 1305). Finally, the module displays the bottleneck analysis result information on the terminal (Step 1306).

Figure 14:
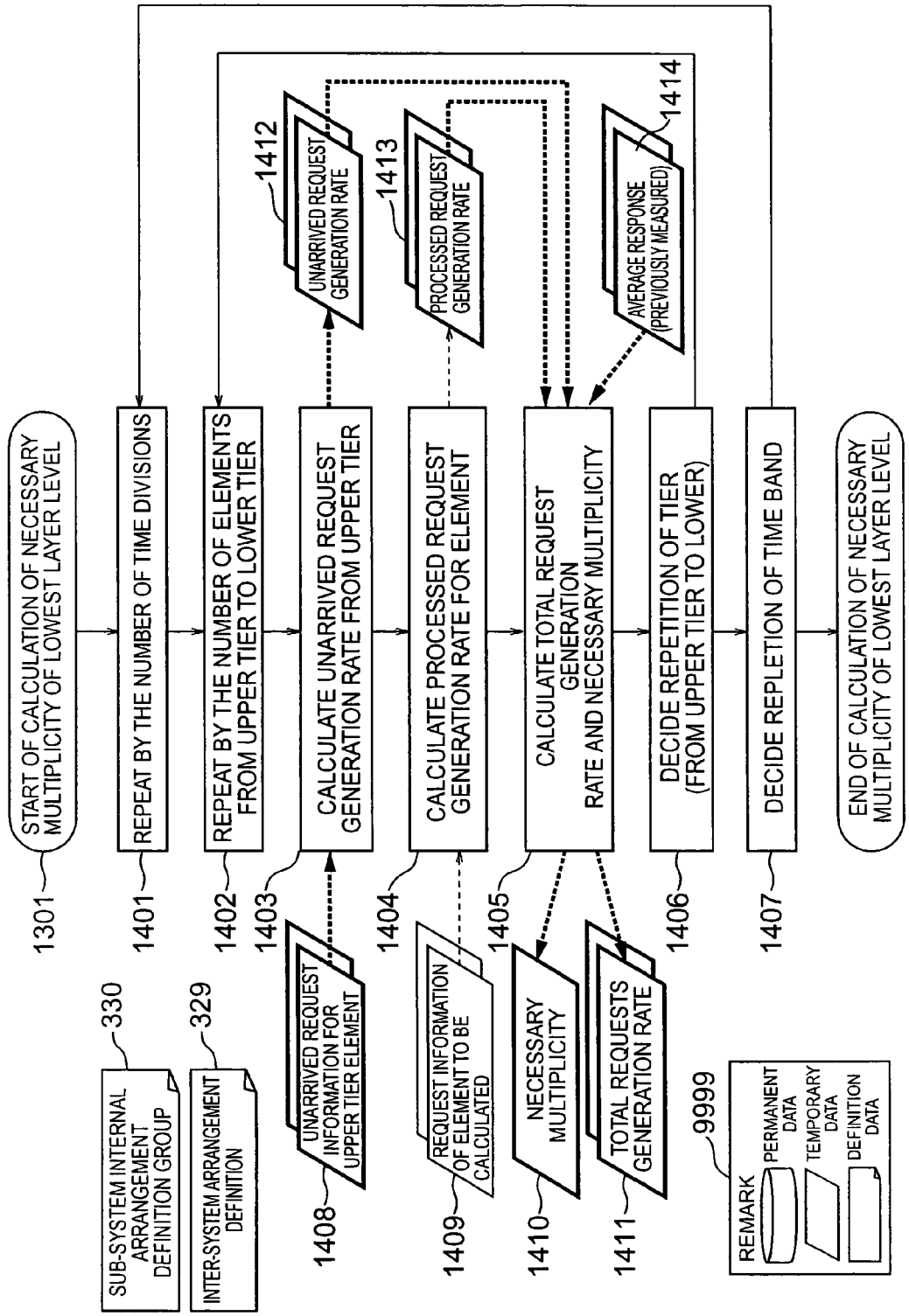
FIG. 14 is a flowchart showing details of operations of calculating a necessary multiplicity of a lowest level.

FIG. 14 shows a flowchart of details of Step 1301 (necessary multiplicity calculation process of an element of lowest level) in FIG. 13. In Step 1301, the sub-system internal arrangement definition group 330 and the inter-system arrangement definition 329 (FIG. 3) are used in subsequent sub-steps. In FIG. 14, Steps 1401 to 1407 are repeated by the number of time band (time divisions). That is, a time band is selected in Step 1401, and it is decided whether or not there is another time bank (not selected) in Step 1407 (repetition decision). Steps 1402 to 1406 are repeated by the number of elements from an upper tier element toward a lower tier element. In other words, one of unprocessed elements having an upper (uppermost) layer is selected in Step 1402, whereas, it is decided whether or not there is an unprocessed element in Step 1406 (repetition decision).

The bottleneck analysis module 321 first calculates an unarrived request generation rate from the upper tier (Step 1403). More specifically, (1) the module identifies transmission destination element to be processed on the basis of unarrived request information 1408 (information stored in the request information database 332 in Step 1204 of FIG. 12) of each upper tier element, and calculates the number of unprocessed requests for each request path. When the module fails to identify the transmission destination, calculates a distribution to each transmission destination element, and calculates the number of untransmitted requests for each request path as a weighting value from a predicted value or a past history. And the module calculates a request generation rate (untransmitted request generation rate) for each request path from the calculated request number and the generation time of each request. (2) Next, the module calculates a request generation rate (unprocessed request generation rate) for each request path from the calculated unprocessed request number and the generation time of each request. (3) The module calculates an unarrived request generation rate from the upper tier by summing the untransmitted request generation rate and the unprocessed request generation rate. And the module stores the calculated information in an unarrived request generation rate 1412.

Next the module calculates a generation rate of a request processed in an element (Step 1404). More specifically, the module calculates a generation rate of the request processed in the element on the basis of processed request information 1409 (information stored in the request information database 332 in Step 1204 of FIG. 12) of the element to be calculated. And the module stores the calculated result in a processed request generation rate 1413.

Finally, the module calculates a total requests generation rate for each request path of the element to be calculated a multiplicity necessary for processing it, from the request generation rates 1412 and 1413 calculated in Steps 1403 and 1404 and from the previously-measured average response 1414 (Step 1405). More specifically, the module calculates a total requests generation rate for each request path by summing the request generation rates 1412 and 1413. The module calculates a necessary multiplicity for each request path in accordance with the calculation equation 1009 of FIG. 10, and sums necessary multiplicities for all request paths relating to the element to calculate a necessary multiplicity.

With it, the module can accurately find a necessary multiplicity for an element, can covert necessary multiplicities individually calculated in different request paths into a value (which can be used as a multiplicity set value) similar to a multiplicity set value as the parameter of an element. Thus this can assist the operator in his design work of deriving an optimum parameter value.

Figure 15:
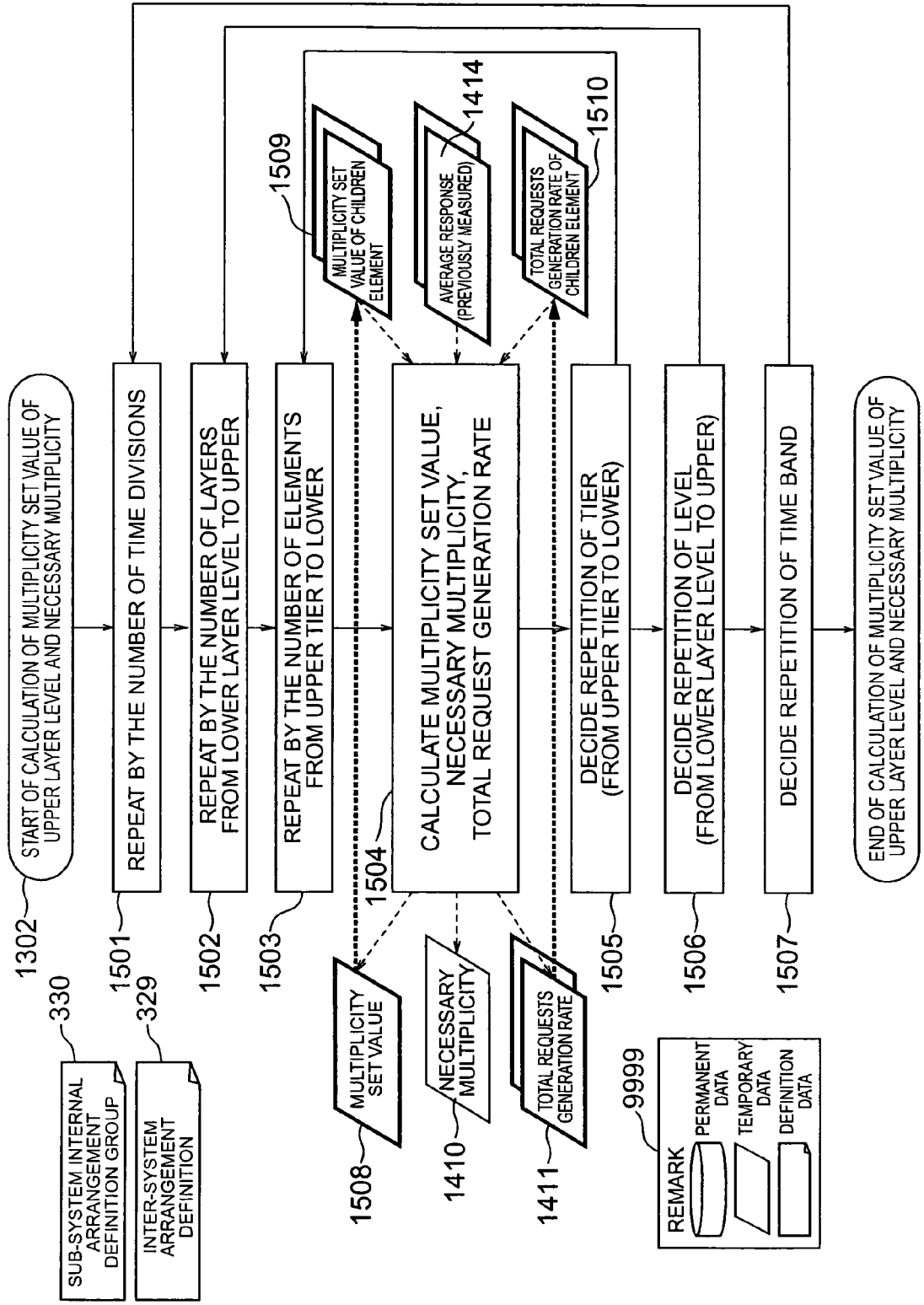
FIG. 15 is a flowchart showing details of operations of calculating a necessary multiplicity of an uppermost layer level.

FIG. 15 shows a flowchart of details of Step 1302 (process of calculating a multiplicity set value and a necessary multiplicity for a system element of upper layer level) in FIG. 13. In Step 1302, the sub-system internal arrangement definition group 330, inter-system arrangement definition 329, inter-system arrangement definition 329 within a sub-system are used in subsequent sub-steps. Even in Step 1302, similarly to Step 1301 in FIG. 14), Steps 1501 to 1507 are repeated by the number of time bands (time divisions); and Steps 1503 to 1505 are repeated by the number of elements from an upper tier element toward a lower tier element. Further, Steps 1502 to 1506 are repeated by the number of layers from an element of lower layer level toward an element of upper layer level. In other words, a layer of lower layer level (lowest layer level) in a time band is selected in Step 1502; while it is decided whether or not there is an unprocessed layer in Step 1506 (repetition decision).

In Step 1504, the bottleneck analysis module calculates a multiplicity set value, a necessary multiplicity, and a total requests generation rate. In Step 1504, only ones of total requests generation rates 1411, which are requests to a children element of an element (parent element) to be calculated and which are sent from outside of the parent element, are to be calculated. The bottleneck analysis module 321 sums multiplicity set values 1509 of the children elements included in the element to be calculated to calculate a multiplicity set value 1508 of the element in question, on the basis of the multiplicity set value 1509 (the necessary multiplicity 1410 of lowermost layer level found in FIG. 14) of the element, the average response 1414 previously measured, and the total requests generation rate 1510 (the total requests generation rate 1411 found in FIG. 14) of the children element. The module also sums all request generation rates for each request path of the children element to calculate the total requests generation rate 1411 of the element for each request path. The module further calculates the necessary multiplicity 1410 for each request path in accordance with the calculation equation 1009 shown in FIG. 10.

In Step 1504, the multiplicity set value 1508 calculated for a layer is used as a multiplicity set value 1509 as input data of Step 1504 in an upper level layer. Similarly, the total requests generation rate 1411 calculated for a layer is used as the total requests generation rate 1510 of the children element as input data of Step 1504 in an upper level layer.

Through the process of Step 1504, a request generation rate of an upper layer level necessary for the analysis result display area 514 can be derived, and a frequency of try and error for system tuning based on multiplicity can be reduced.

Figure 16:
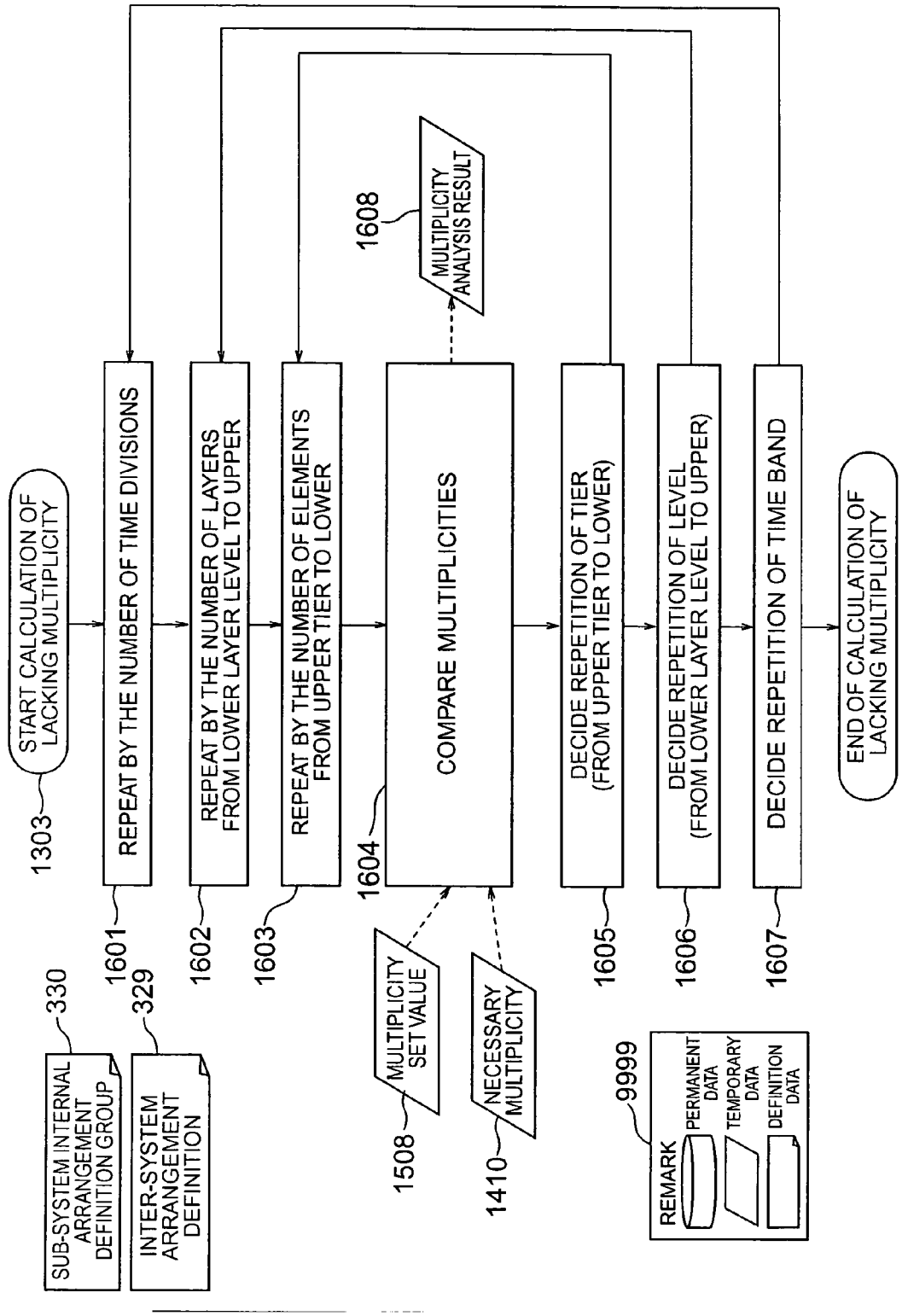
FIG. 16 is a flowchart showing details of a multiplicity lack calculation process.

FIG. 16 shows a flowchart of details of Step 1303 (process of calculating a lacking multiplicity) in FIG. 13. Even in Step 1303, the sub-system internal arrangement definition group 330 and the inter-system arrangement definition 329 are used in subsequent sub-steps. Even in Step 1303, similarly to Step 1302 in FIG. 15, Steps 1601 to 1607 are repeated by the number of time bands (time divisions), and Steps 1602 to 1606 are repeated by the number of layers from an element of lower layer level toward an element of upper layer level. Steps 1603 to 1605 are repeated by the number of elements from an element of upper tier toward an element of lower tier.

In Step 1604, the multiplicity set value 1508 as an output result of FIG. 15 (Step 1504) is compared with the necessary multiplicity 1410. More in detail, the bottleneck analysis module decides to be normal when (necessary multiplicity)≦(multiplicity set value); whereas, the module decides that the presence of a bottleneck when (necessary multiplicity)>(multiplicity set value). And the module stores its comparison result as a multiplicity analysis result 1608.

Through the process of Step 1604, a necessary multiplicity of upper layer level necessary for the analysis result display area 514 can be derived and a frequency of try and error for system tuning based on multiplicity can be reduced advantageously.

Figure 17:
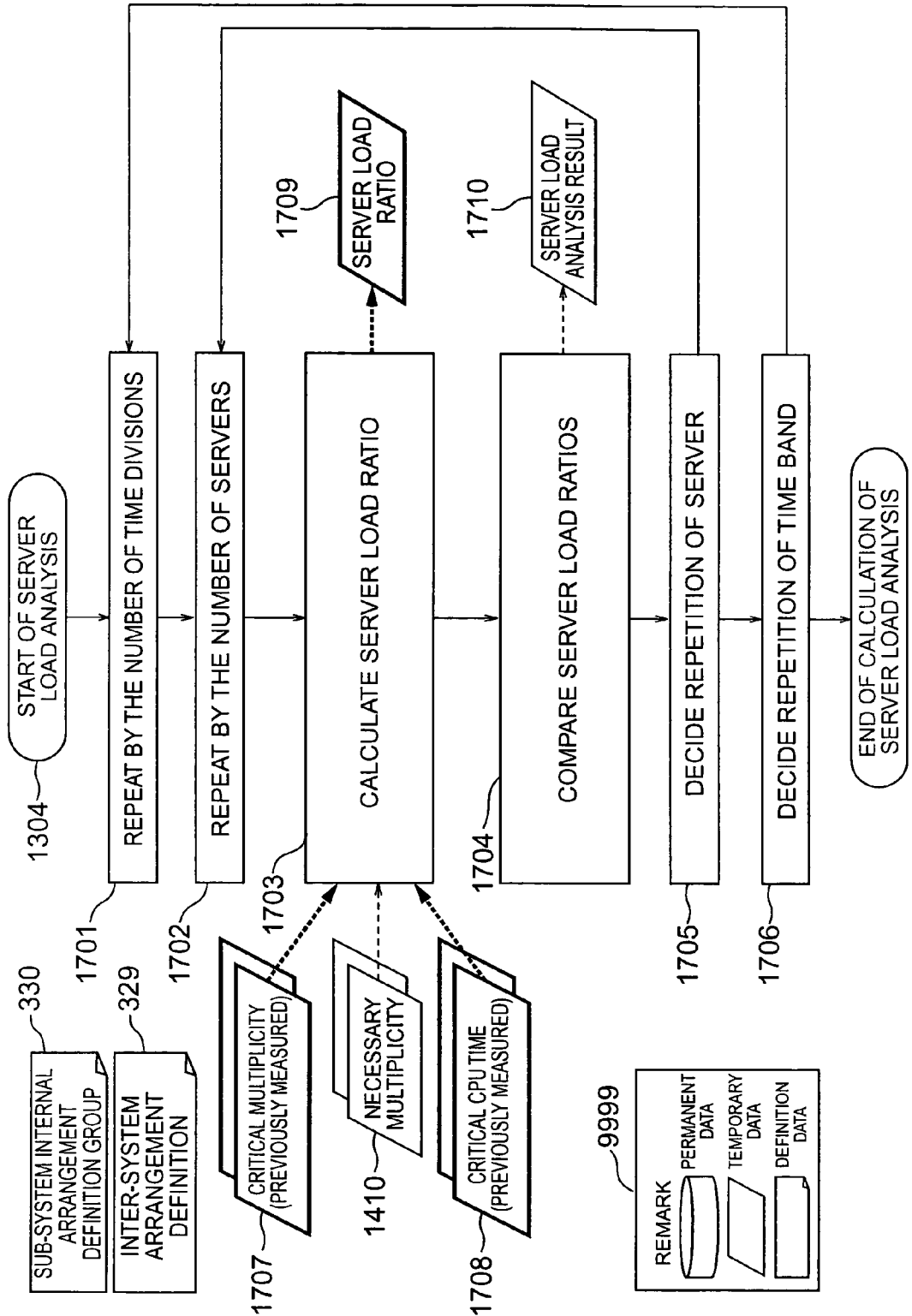
FIG. 17 is a flowchart showing details of a server load analysis process.

FIG. 17 shows a flowchart of details of Step 1304 (server load analysis process) in FIG. 13. Even in Step 1304, the sub-system internal arrangement definition group 330 and the inter-system arrangement definition 329 are used in subsequent sub-steps. Even in Step 1304, Steps 1701 to 1706 are repeated by the number of time bands (time divisions). Steps 1702 to 1705 are repeated by the number of servers (nodes). The module selects a server to be calculated in Step 1702, whereas, the module decides whether or not there is another server not subjected to the load analysis process yet in Step 1705 (repetition decision).

The bottleneck analysis module first calculates a server load ratio (Step 1703). More specifically, on the basis of the previously-measured critical multiplicity 1707 and critical CPU time 1708 for each request path and the necessary multiplicity 1410 (output result of FIG. 15) for each request path corresponding to a server to be calculated, the module calculates a server load ratio for each request path in accordance with the critical CPU time 1708 (necessary multiplicity 1410/critical multiplicity 1707)×(critical CPU time 1708), and sums calculation results for all request paths to calculate a load ratio 1709 of a server. And the module stores the calculation result as a server load ratio 1709.

The server load ratio 1709 is compared (Step 1704). More specifically, the module decides to be normal when (server load ratio)≦100%; whereas, the module decides the present of a bottleneck when (server load ratio)>100%. And the module stores the comparison result as a server load analysis result 1710 relating to multiplicity.

Through Step 1304, information necessary for display of the state 528, guide 529 and reason 530 in the analysis result display area 514 can be derived. This can assist the operator in his design work of an optimum system arrangement establishing compatibility between the performance security and the system running stability and deriving optimum parameter values. In Step 1703 (server load ratio analysis process), a relation between the multiplicity and the critical CPU time is used. However, the critical CPU time may be replaced by the memory system cache ((the use quantity of memory for the critical multiplicity) divided by (the full capacity of actual memory)), or by the critical IO rate ((a frequency of IO generation per unit time for the critical multiplicity) divided by (a frequency of IO issuance per unit time issuable when an IO-alone issuable program was executed for the critical multiplicity)). And when the analysis result is "bottleneck generation"; "memory addition", "scale-out" or the like is displayed in the guide 529.

Figure 18:
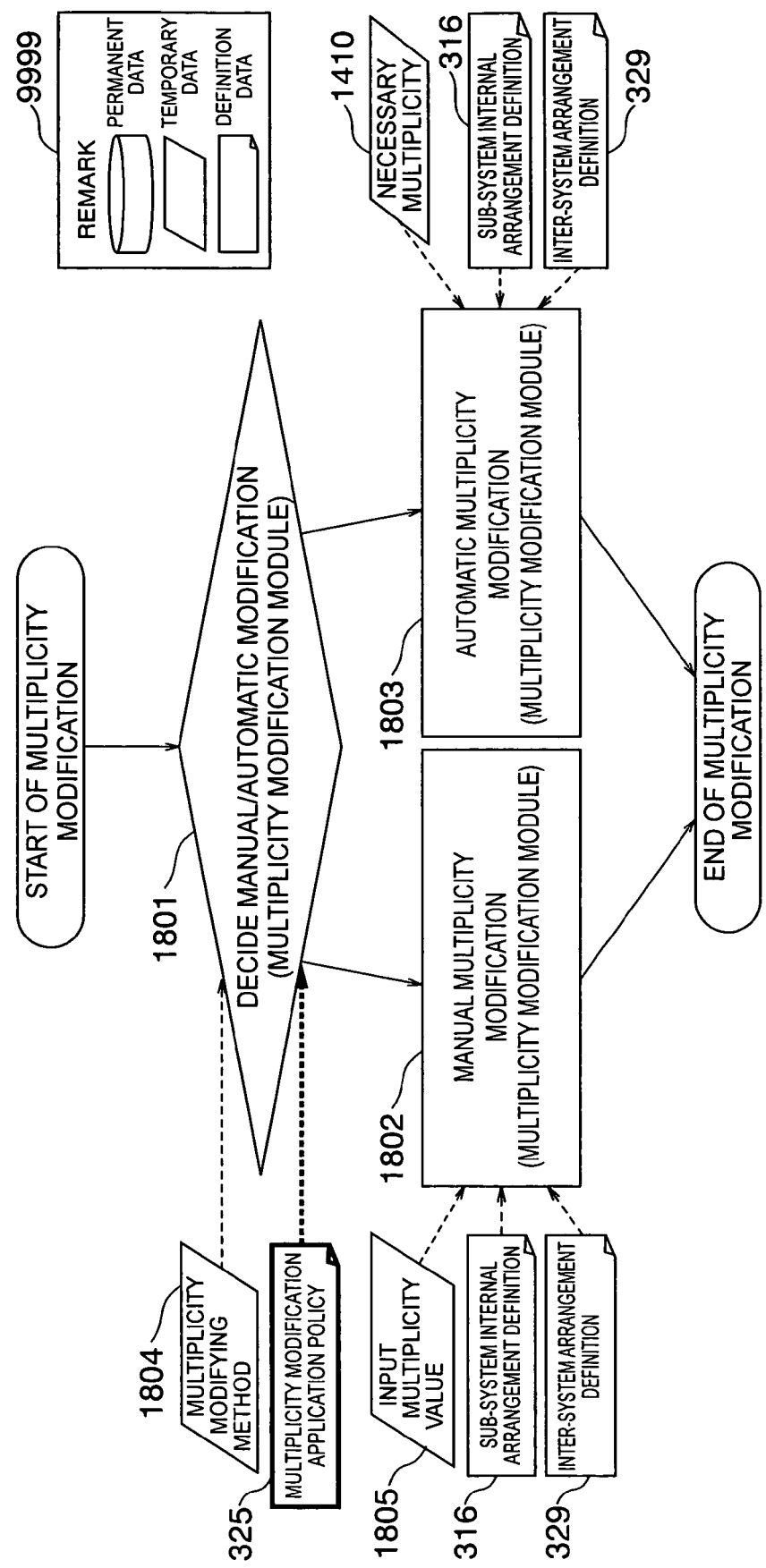
FIG. 18 is a flowchart showing details of a multiplicity modification process.

Shown in FIG. 18 is a flowchart of details of the multiplicity modification process (Step 203 in FIG. 2) to be carried out by the multiplicity modification module 326.

The multiplicity modifying method first decides whether an element to be processed is modified manually or automatically (Step 1801). More specifically, the module decides the above on the basis of the multiplicity modifying method 1804 (corresponding to the multiplicity modifying methods 814, 816, etc. shown in FIG. 8) for defining whether a multiplicity for each element is modified manually or automatically and a multiplicity modification application policy 325 (FIG. 3) for defining the range of a children element of the element to be automatically modified.

When the module decides the manual modification in Step 1801, the module sets a multiplicity value 1805 entered from the terminal for a multiplicity set value of the element to be processed which is searched for based on the sub-system internal arrangement definition 316 and the inter-system arrangement definition 329 (Step 1802).

When deciding the automatic modification in Step 1801, the module sets the necessary multiplicity 1410 calculated in the bottleneck analysis process 202 or the influence analysis process 204 for the multiplicity set value 1508 of the processing element searched for based on the sub-system internal arrangement definition 316 and the inter-system arrangement definition 329.

FIG. 19 shows a flowchart of a summary of the influence analysis process (Step 204 in FIG. 2) to be carried out by the influence analysis module 324.

The influence analysis module first recalculates a necessary multiplicity of lowest layer level (Step 1901). In Step 1901, the module recalculates a multiplicity for each other element of lowest layer level influenced by modifying the multiplicity of an element and for each time band. Details of the process of Step 1901 will be explained layer in FIGS. 20 to 22. Next, on the basis of the multiplicity set value of the element of lowest layer level and the necessary multiplicity recalculated in Step 1901, the module recalculates a multiplicity set value and a necessary multiplicity for each element of upper layer level and for each time band (Step 1902). The module then compares the multiplicity set value and necessary multiplicity recalculated in Step 1901 or Step 1902 to recalculate a multiplicity lacking for each element/time band (Step 1903). On the basis of a critical multiplicity and the necessary multiplicity calculated in Step 1902, the module calculates a load state for each server/time band to reanalyze power lacking server and time band (Step 1904). On the basis of the sub-system internal arrangement definition group 330, inter-system arrangement definition 329, and the influence analysis result of Steps 1901 to 1904, next, the module creates influence analysis result information for each layer/time band (Step 1905). Finally, the module displays the influence analysis result information created in Step 1905 on the terminal (Step 1906).

In the above process, Steps 1902 to 1904 are similar to Steps 1302 to 1304 of the bottleneck analysis process shown in FIG. 13, except that the multiplicity set value recalculated in Step 1901 and the necessary multiplicity are used as inputs. Steps 1905 and 1906 are similar to Steps 1305 and 1306 of FIG. 13, except differences in items shown in FIG. 5 (in particular, the influence analysis result area 520). Accordingly, details of Step 1902 is shown in FIG. 15, details of Step 1903 is shown in Step 1903, and details of Step 1904 is shown in Step 1904.

Figure 20:
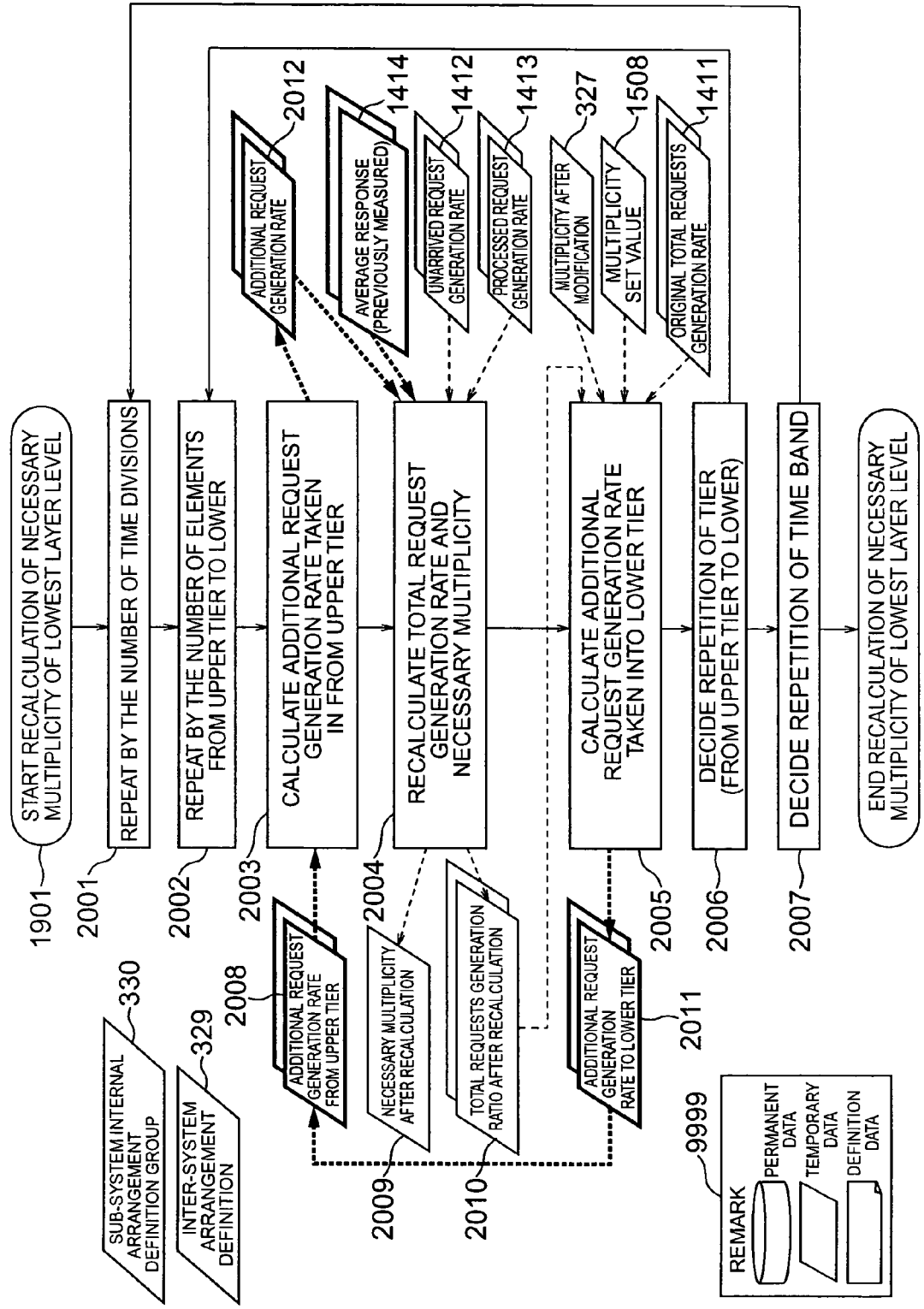
FIG. 20 is a flowchart showing details of operations of recalculating the necessary multiplicity of the lowest level.

FIG. 20 shows a flowchart of details of Step 1901 (lowest layer level necessary multiplicity process) in FIG. 19. In Step 1901, the sub-system internal arrangement definition group 330 and the inter-system arrangement definition 329 are used in subsequent sub-steps. In Step 1901, similarly to FIG. 14, Steps 2001 to 2007 are repeated by the number of time bands (time divisions), and Steps 2002 to 2006 are repeated by the number of elements from an upper tier element toward lower tier element.

The influence analysis module first calculates an additional request generation rate taken into an upper tier (Step 2003). More specifically, on the basis of the additional request generation rate 2008 (which will be explained later in Step 2005) from each upper tier element, the module calculates, for request path, an additional request generation rate 2012 predicted to be additionally taken from the upper tier element into the element to be calculated; and stores the calculated result in a request generation rate 323 (FIG. 3) for each element/time band/request path. Details of the process of Step 2003 will be explained later in FIG. 21.

The module then recalculates a total request generation rate and a necessary multiplicity (Step 2004). More specifically, on the basis of the unarrived request generation rate 1412, processed request generation rate 1413, and average response 1414 (any of which is similar to that used in Step 1405 of FIG. 15); the module recalculates a total requests generation rate for each request path of the element to be calculated and a multiplicity necessary for processing all requests; and stores them in a total requests generation ratio 2010 after the recalculation and in a necessary multiplicity 2009 after the recalculation, respectively.

Next, the module calculates an additional request generation rate taken into a lower tier (Step 2005). More specifically, on the basis of the total requests generation ratio 2010 after the calculation, recalculated in Step 2004, the multiplicity 327 (necessary multiplicity modified by the multiplicity modification process of FIG. 18) after the modification, the multiplicity set value 1508, and the original total requests generation rate 1411, the module calculates an additional request generation rate predicted to be additionally taken into a lower tier element by modifying the multiplicity set value of the calculation target element; and stores the calculated additional request generation rate as a lower tier additional request generation rate 2011. And the lower tier additional request generation rate 2011 as the calculation result is used as the additional request generation rate 2008 from an upper tier in the process of Step 2003 for an element located at an lower tier of the target element.

Figure 21:
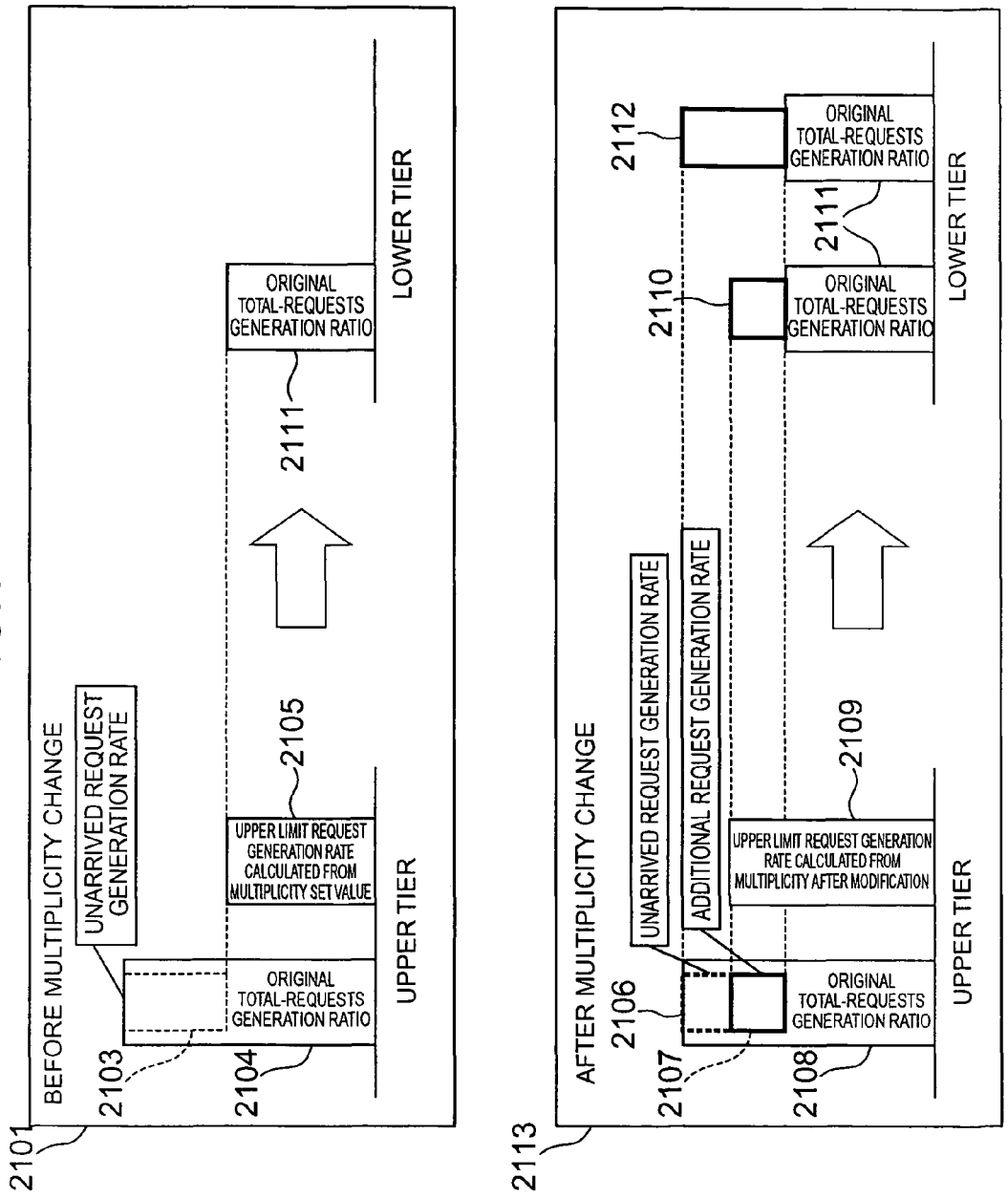
FIG. 21 shows an example of a relation of a generation rate of an added request taken in from an upper tier.
Figure 22:
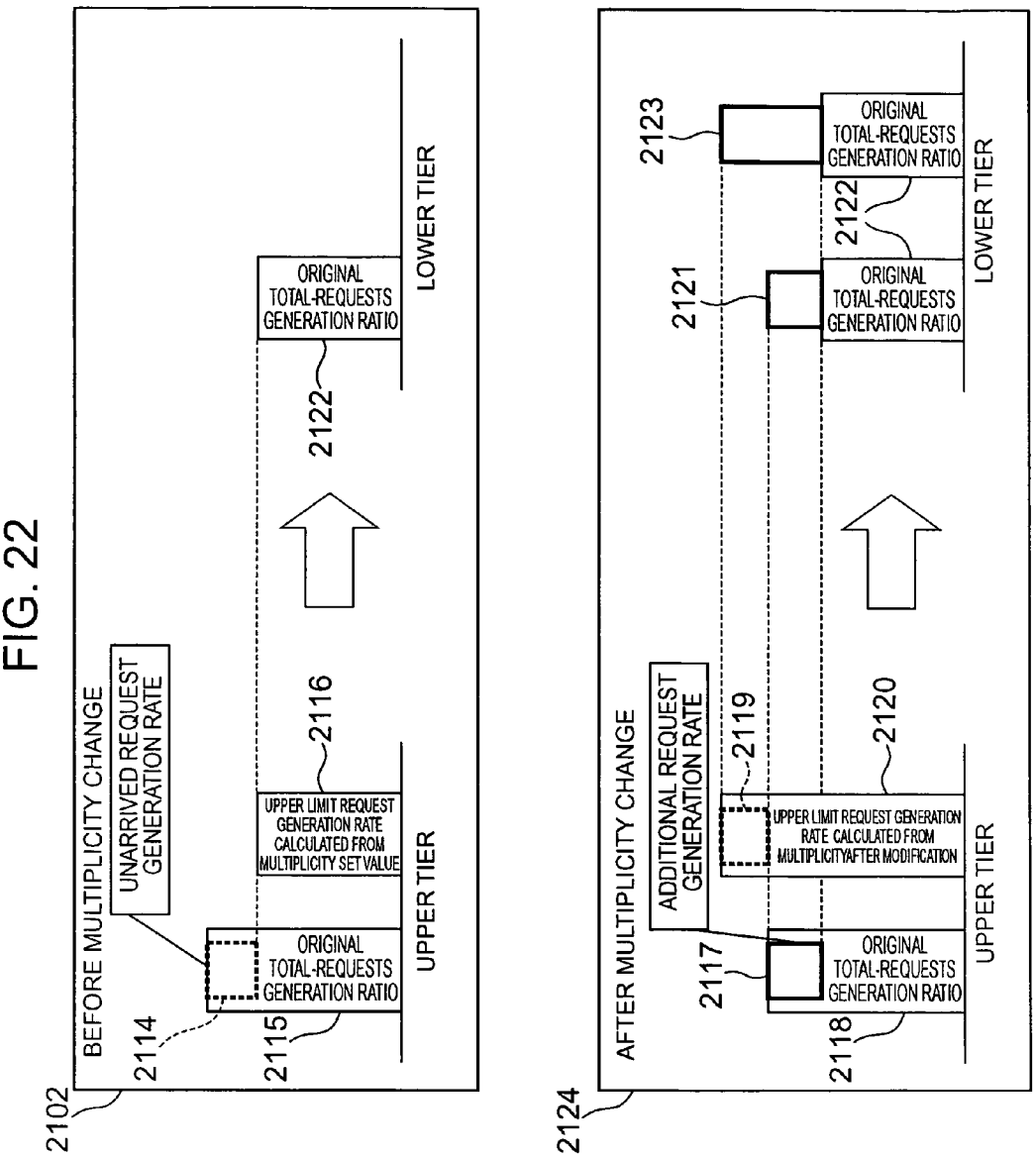
FIG. 22 shows another example of the relation of a generation rate of an added request taken in from an upper tier.

Shown in FIGS. 21 and 22 is how to calculate an additional request generation rate in Step 2003 (the process of calculating an additional request generation rate taken in from an upper tier element) of FIG. 20. FIG. 21 is when a multiplicity after modification fails to reach a necessary multiplicity; and FIG. 22 is when the multiplicity after the modification exceeds the necessary multiplicity.

In FIG. 21, when an original total requests generation rate 2104 and an upper limit request generation rate 2105 calculated from a multiplicity set value have such a relation as shown in the drawing in State 2101 before multiplicity change of an upper tier; a difference between the above request generation rates becomes an unarrived request generation rate 2103. In State 2113 after the multiplicity set value is changed, when an upper limit request generation rate 2109 is increased as shown, a difference from the original upper limit request generation rate 2105 becomes an additional request generation rate 2107 taken into a lower tier. A difference between an original total requests generation rate 2108 (=2104) and the upper limit request generation rate 2109 after the modification becomes an unarrived request generation rate 2106 after the recalculation.

Under such circumstances, if an original total requests generation rate 2111 of a lower tier has such a value as shown in the drawing, by changing the multiplicity of upper tier (State 2113), the additional request generation rate 2107 becomes an additional request generation rate 2110 taken newly into the lower tier. When the multiplicity of an upper tier is further increased in future, the unarrived request generation rate 2106 after the recalculation of the upper tier may be taken into the lower tier. A sum of these request generation rates 2107 and 2106 is an additional request generation rate 2112 to be taken into the lower tier in future.

In FIG. 22, when an upper limit request generation rate 2116 calculated from the multiplicity set value has such a relation as shown in the drawing in State 2102 before change of the multiplicity of an upper tier, a difference therebetween becomes an unarrived request generation rate 2114. In State 2124 after the change of the multiplicity set value, if an upper limit request generation rate 2120 is increased as shown in the drawing, a difference from the original upper limit request generation rate 2116 becomes an additional request generation rate 2117 taken into the lower tier. Further, since (original total requests generation rate 2118 (=2115))<(upper limit request generation rate 2120), there is no unarrived request generation rate after recalculation (which point is different from FIG. 21).

In such circumstances, when an original total requests generation rate 2122 of the lower tier has such a value as shown in the drawing, the additional request generation rate 2117 becomes an additional request generation rate 2121 newly taken into the lower tier by changing the multiplicity of the upper tier (State 2124). When a request taken into the upper tier is increased in future, a difference 2119 between the upper limit request generation rate 2120 after the change of the upper tier (after the recalculation of the multiplicity) and the original total requests generation rate 2118 (=2115) may be additionally taken into the lower tier. Accordingly, a sum of the request generation rates 2117 and 2119 becomes an additional request generation rate 2123 possibly taken into the lower tier in future.

A "currently-estimated additional request generation rate" indicating a request generation rate newly taken in by changing the multiplicity of the upper tier or a "future estimated additional request generation rate" indicating a request generation rate possibly taken in in future by changing the multiplicity of the upper tier becomes "0" or minus in some cases. Such numeric value being "0" means "no generation of additional request"; whereas, such numeric value being minus means that "the request generation rate is decreased by an amount corresponding to a sum of the original total requests generation rate and the negative additional request generation rate".

An example of how to calculate an additional request generation rate take into a lower tier for each request path after multiplicity modification in Step 2005 in FIG. 20 will now be shown. It is assumed that an upper limit request generation rate Rka after multiplicity change for a request path 'k' is proportional to a ratio of total requests generation ratio for 'k' to total requests generation ratio. Or it can also be assumed that the upper limit request generation rate Rka is proportional to a ratio of processed total requests generation ratio for 'k' to processed total requests generation ratio, or to a ratio of unarrived total requests generation ratio for 'k' to unarrived total requests generation ratio. In other words, the upper limit request generation rate Rka after the multiplicity change for the request path 'k' is expressed as an equation, $$Rka = \alpha(Rkt/Rt) \quad (1)$$

Wherein $\alpha$ is a proportional constant (assuming to be common to all request paths), Rkt is total requests generation ratio for the request path 'k', and Rt is total requests generation ratio. Hence a multiplicity 'mka' for use in the request processing for the request path 'k' after the multiplicity change is expressed (by substituting Equation (1) into the calculation equation 1009 of FIG. 10 and Rka) as an equation, $$mka = Rka \cdot Tk = \alpha(Rkt/Rt)Tk \quad (2)$$

Wherein Tk is an average response for the request path 'k'. When there are 'n' types of request paths, multiplicity (parameter to be actually set) Mta after total change is as follows.

$$Mta = mla + \cdots + mna = \sum_{k=1}^{n}(mka) \quad (3)$$

Substitution of Equation (2) into Equation (3) results in, $$\alpha = Mta \bigg/ \left(\sum_{k=1}^{n}((Rkt/Rt)Tk)\right) \quad (4)$$

Substitution of equation (4) into equation (1) results in, $$Rke = Rka - Rkr = \left(Mta \bigg/ \left(\sum_{k=1}^{n}(Rkt/Rt)Tk\right)\right)(Rkt/Rt) - Rkr \quad (5)$$

Wherein Rke is an additional request after multiplicity modification for the request path 'k', Rkr is a processed request generation rate (the request generation rate actually taken in before multiplicity change) for the request path 'k'.

Figure 23:
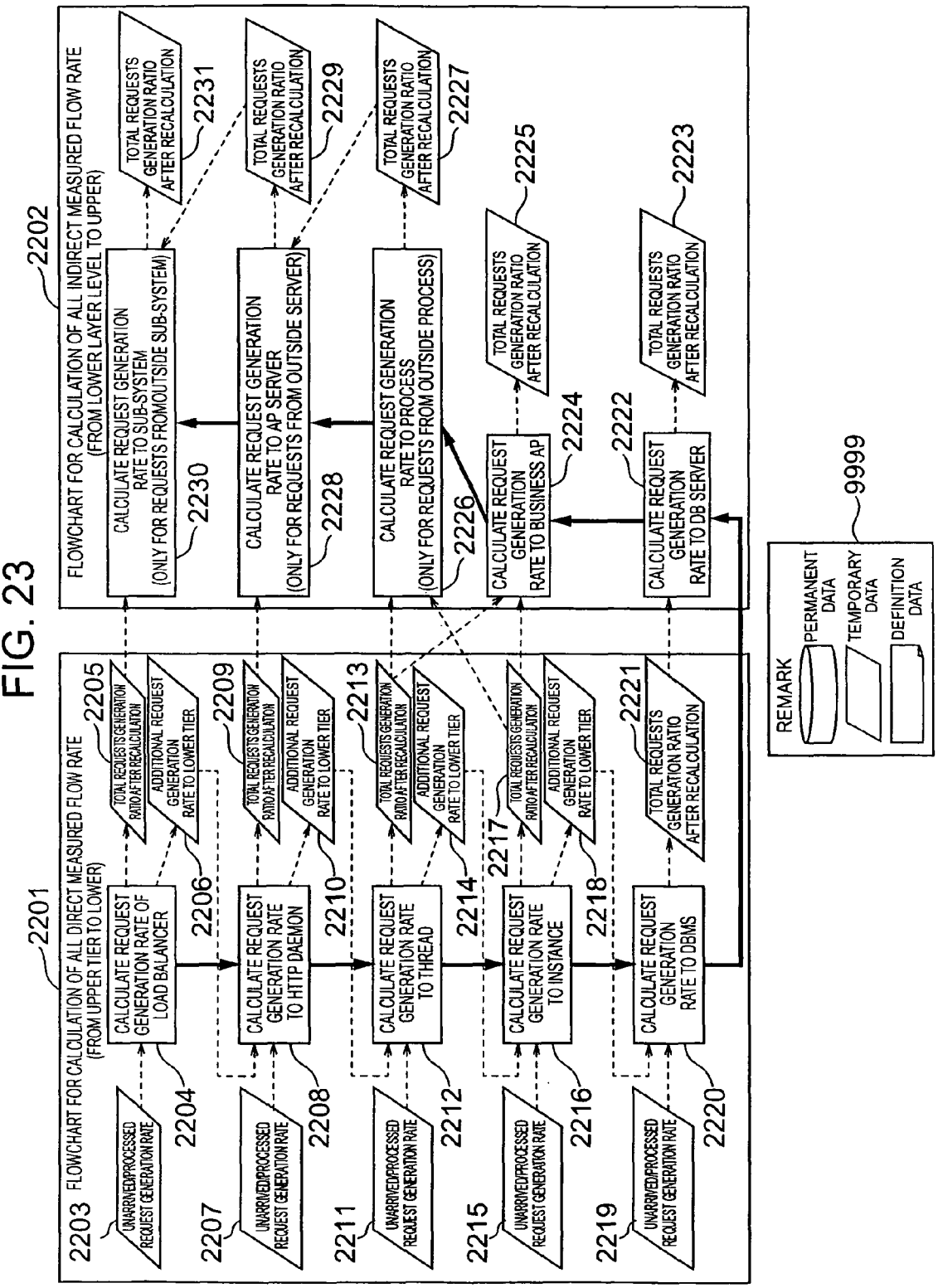
FIG. 23 shows how the added request generation rate is transmitted to elements of lower tiers or to elements of upper tiers.

FIG. 23 is a chart for explaining how an additional request generation rate calculated in Steps 2003 and 2005 in FIG. 20 is transmitted to a lower tier element or an upper layer element. In the system arrangement in FIG. 23, similarly to FIG. 4, a DB server comprises a DBMS, a business AP is present in a thread and an instance, a process has a thread and an instant, and AP server has a process and an HTTP daemon, and a sub-system has a load balancer, an AP server and a DB server. And it is assumed that a request is transmitted through a system element of lowest layer level→load balancer→HTTP daemon→thread→instance→DBMS, in an order.

A flowchart 2201 show a manner that an additional request generation rate calculated for each element is transmitted to a lower tier. This corresponds to Step 1901 in FIG. 10 and, for details thereof, refer to FIG. 20. Steps in the flowchart 2201 are processed by the influence analysis module (FIG. 3).

On the basis of an unarrived/processed request generation rate 2203 for an element in the upper tier of the load balancer, the influence analysis module first calculates a total requests generation ratio 2205 after recalculation of the load balancer an additional request generation rate 2206 to a lower tier (HTTP daemon) (Step 2204). On the basis of the additional request generation rate 2206 from the load balancer and an unarrived/processed request generation rate 2207 in the load balancer, the module then calculates a total requests geration ratio 2209 after recalculation of the HTTP daemon and an additional request generation rate 2210 to a lower tier (thread) (Step 2208). On the basis of the additional request generation rate 2210 from the HTTP daemon and an unarrived/processed request generation rate 2211 in the HTTP, next, the module calculates a total requests generation ratio 2213 after recalculation of the thread and an additional request generation rate 2214 to a lower tier (Step 2212).

Subsequently, on the basis of the additional request generation rate 2214 from the thread and total requests generation ratio 2215 in the thread, the module calculates a total requests generation ratio 2217 after recalculation of an instance and an additional request generation rate 2218 to a lower tier (instance) (Step 2216). Finally, on the basis of the additional request generation rate 2218 from the instance and an unarrived/processed request generation rate 2219 from the instance, the module calculates a total requests generation ratio 2221 after recalculation of a DBMS (Step 2220).

In the flowchart 2201, the unarrived/processed request generation rates 2203, 2207, etc. correspond to the unarrived request generation rate 1412 and the processed request generation rate 1413 in FIG. 20; the total requests generation ratios 2205, 2209, etc. after the recalculation correspond to the total requests generation ratio 2010 after the recalculation in FIG. 20; and the additional request generation rates 2206, 2210, etc. to a lower tier correspond to the lower tier additional request generation rate 2011 to a lower tier in FIG. 20.

A flowchart 2202 shows a manner that a total requests generation ratio for an element of upper layer level varies with recalculation. This corresponds to Step 1902 in FIG. 19 and for details thereof, refer to FIG. 15. Respective steps in the flowchart 2202 are processed by the influence analysis module 324 (FIG. 3).

On the basis of the total requests generation ratio 2221 taken from outside the server into a DB server, the module first calculates a total requests generation ratio 2223 after recalculation of the DB server (Step 2222). On the basis of the total requests generation ratio 2213 or 2217 taken from outside the business AP into the business AP, the module then calculates a total requests generation ratio 2225 after recalculation of the business AP (Step 2224). In this connection, use of the total requests generation ratio 2213 means to calculate about the business AP in a thread; whereas, use of the total requests generation ratio 2217 means to calculate about the business AP in an instance.

On the basis of the total requests generation ratios 2213 and 2217 taken from outside of a process into the process, the module calculates a total requests generation ratio 2227 after recalculation of the process (Step 2226). Subsequently, on the basis of the total requests generation ratio 2209 taken from outside a server into an AP server and the total requests generation ratio 2227 (calculated in Step 2226), the module calculates a total requests generation ratio 2229 after recalculation of the AP server (Step 2228). Finally, on the basis of the total requests generation ratio 2205 from outside of a sub-system into the sub-system and the total requests generation ratio 2229 (calculated in Step 2228), the module calculates a total requests generation ratio 2231 after recalculation of the sub-system (Step 2230).

Figure 24:
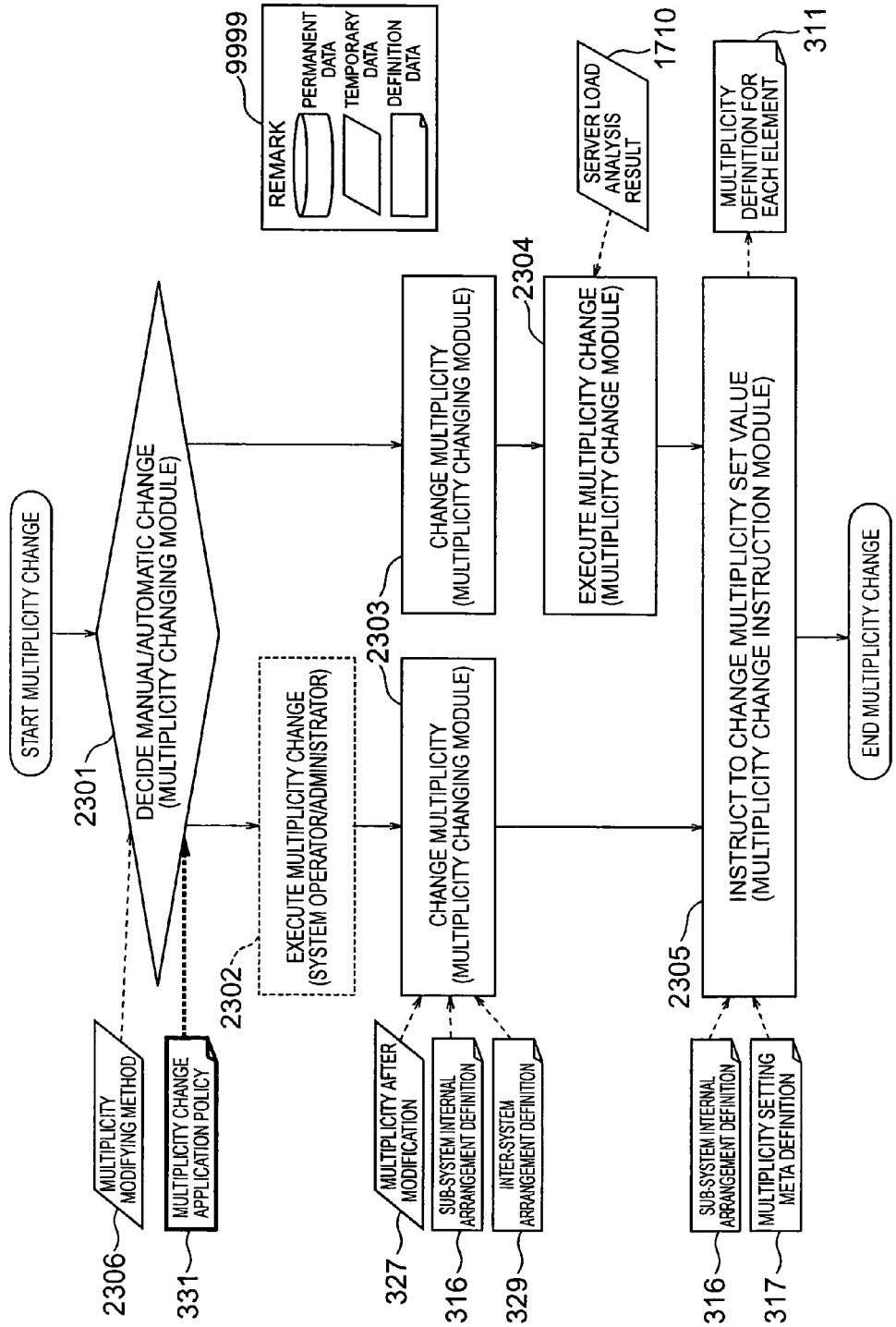
FIG. 24 is a flowchart showing details of a multiplicity change process.

FIG. 24 shows a flowchart of details of Step 205 (multiplicity change process) in FIG. 2.

The multiplicity change module 328 first decides whether multiplicity change of an element to be changed is carried out manually or automatically (Step 2301). More specifically, the multiplicity change module 328 decides the above on the basis of the multiplicity modifying method 2306 (corresponding to the multiplicity modifying methods 815, 817, etc. in FIG. 8) for defining the manual or automatic change of a multiplicity for each element and the multiplicity change application policy 331 (FIG. 3) for defining the range of the automatic change of a children element of the element.

When deciding the automatic change in Step 2301, the multiplicity change module 328 change a multiplicity (Step 2303). More specifically, the multiplicity change module 328 transmits information to instruct the multiplicity change to the multiplicity change instruction module 315 of the individual sub-system's multiplicity adjustment server 105 so that the multiplicity 327 after modification modified by the multiplicity modification process (Step 203 in FIG. 2) and the influence analysis process (Step 204 in FIG. 2) is changed to the multiplicity set value 1508 of the process target element searched for based on the sub-system internal arrangement definition 316 and the inter-system arrangement definition 329.

The multiplicity change instruction module 315 when receiving the multiplicity change instruction information from the multiplicity change module 328, instructs the target element to change a multiplicity set value (Step 2305). More specifically, on the basis of the received multiplicity change instruction information, the sub-system internal arrangement definition 316, and the multiplicity setting meta definition 317; the module changes the multiplicity definition 311 for each element to instruct to reload the multiplicity definition 311 to the multiplicity adjustment agents 110 and 112.

When deciding the manual change in Step 2301, the multiplicity change module 328 accepts entry of the multiplicity after change from the monitored system operator/administrator, and transmits information relating to the change multiplicity to the multiplicity change instruction module 315 (Step 2302). And the multiplicity change instruction module 315 performs the process of the above Step 2305.

Through operations shown in FIG. 24, even in the case of any of the manual and automatic, definition information for setting multiplicities distributed to products can be managed at one location transversely, the need for the operator to troublesomely understand detailed specifications of the define files of individual products can be eliminated.

As an example of a method for calculating a necessary queue length when an input queue system is employed as a load balancing system, the reception multiplicity control module 305 (FIG. 3: multiplicity adjustment agent 112) (1) integrates histories or sums the histories. Or the module (2) is considered to actually measure a queue length and find a necessary queue length from a standard deviation. The module (3) is considered to modelize the queue length according to an existing probability function, and find a necessary queue length from a normalized standard deviation. The module is considered to (4) first decide a probability and find it by certification, or find it by a similar method.

In accordance with Embodiment 1, by changing a multiplicity for a system element, the present system calculates how a request generation rate for another system element is changed and how this causes a necessary multiplicity (multiplicity necessary for processing all requests expected to be processed in the system element) to be changed, and its result is presented to the system user. Therefore, the user can advantageously examine the influence of a load or the like on the entire system caused by a newly added request path or by multiplicity change.

In a business using the Internet, in particular, it is common that, as a company grows and its service expands, the number of service users (customers) is increased. The need for design knowhow when the system increases a multiplicity according to a business scale in this way is high. Thus the present embodiment can advantageously offer a resolution to the need.

Embodiment 2

Figure 25:
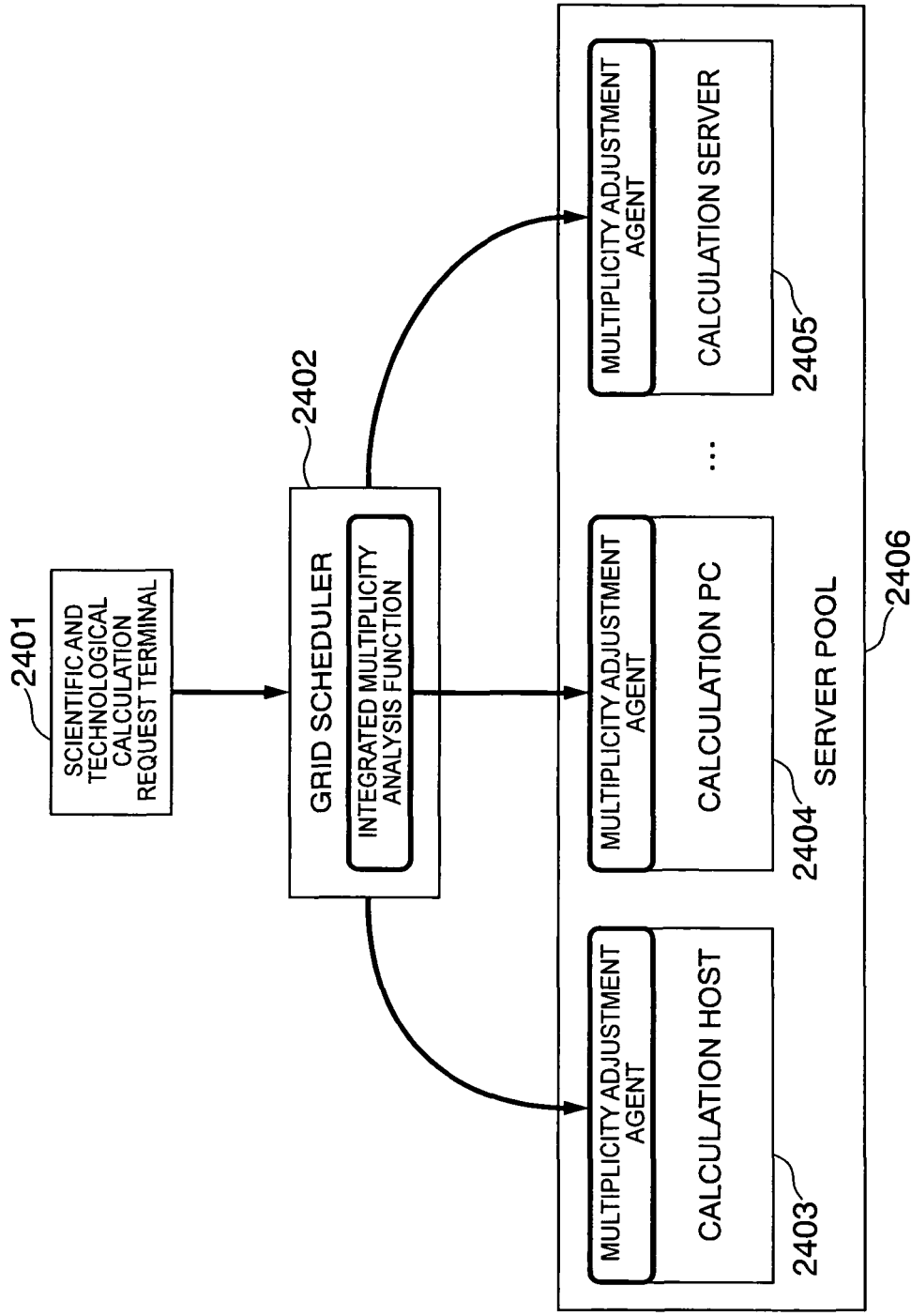
FIG. 25 shows a system configuration when the present invention is applied to a grid computing.

FIG. 25 shows a system arrangement of an example when the present invention is applied to a grid computing. The word "grid computing" as used herein refers to a system wherein a plurality of computers are mutually connected by a network to form a virtual high-performance computer, a user can extract a necessary processing capability or memory capacity therefrom for use, and which can process a large amount of information at a high speed by causing the plurality of computers to perform parallel processing.

In FIG. 25, a grid scheduler 2402 is arranged to accept a request from a scientific and technological calculation request terminal 2401, and relay the request to a plurality of calculation hosts 2403, a calculation PC 2404, and a calculation server 2405 in a server pool 2406, while suitably balancing their loads. A multiplicity adjustment agent is provided to each of the calculation hosts 2403, calculation PC 2404 and calculation server 2405; and a function corresponding to an integrated multiplicity analysis server is provided to the grid scheduler 2402. As a result, such a load balance process as to realize compatibility between the effective use of resource and the stable running of the server can be established. Other structure and processing are the same as those explained in Embodiment 1, except that a different target system is used.

As shown in the present embodiment, the present invention has an advantage that the invention can be applied even to the grid computing, and can offer a resolution to such system design as to increase the capacity (or multiplicity) of the system according to the business scale as in this example.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A multiplicity adjustment system for adjusting a multiplicity of a request to a monitored system, said system comprising:
   a multiplicity adjustment agent for deciding a multiplicity for each of elements included in said monitored system on the basis of a request to each element;
   a multiplicity adjustment server for acquiring information relating to the multiplicity of said request from said multiplicity adjustment agent and storing the information as request information for each element; and
   an integrated multiplicity analysis server comprising a processor and memory for acquiring the stored request information for each element from the multiplicity adjustment server, analyzing the multiplicity of the request for each element on the basis of the acquired request information, and changing the multiplicity of the request for each element according to a result of the analysis;
   wherein said multiplicity adjustment server acquires a request generation rate indicative of a frequency of request generation per unit time, an average response indicative of an average stay-in time of said request, and a request path indicative of one of elements included in said monitored system through which the request goes, from information about said request; and
   wherein said integrated multiplicity analysis server calculates a necessary multiplicity in said monitored system on the basis of a critical multiplicity indicative of a limit value of stable running of a server included in said monitored system, a critical CPU time indicative of a CPU time of said server for said critical multiplicity, said request generation rate, said average response, and said request path.

2. The multiplicity adjustment system according to claim 1, wherein said integrated multiplicity analysis server transmits said calculated necessary multiplicity to said multiplicity adjustment server, and said multiplicity adjustment server instructs said multiplicity adjustment agent to change the multiplicity of said request on the basis of said transmitted necessary multiplicity.

3. A server for modifying a multiplicity for a request in a monitored system, said server comprising:
   a processor and memory;
   a request measured value collecting unit for collecting an actually measured value of the multiplicity of the request on the basis of an element as a target of the request, a time band of the request, and information about a request path indicative of the element through which the request goes;
   a bottleneck analyzing unit for analyzing the collected measured value to analyze one of elements of said monitored system which forms a bottleneck for request processing;
   a multiplicity modifying unit for modifying the multiplicity so as to solve the bottleneck on the basis of a result of the analysis;
   an influence analyzing unit for analyzing an influence when the request processing is carried out on the basis of the modified multiplicity; and
   a multiplicity changing unit for changing the multiplicity about said request on the basis of a result of the influence analysis;
   wherein said bottleneck analyzing unit calculates a necessary multiplicity as a multiplicity necessary for request processing of an element of said monitored system and a multiplicity lacking for the request processing, and decides whether or not the server to which the element belongs forms a bottleneck on the basis of said calculated multiplicity;
   wherein said request measured-value collecting unit acquires a request generation rate indicative of a frequency of request generation, an average response indicative of an average stay-in time of said request, and a request path indicative of one of elements of said monitored system through which said request goes, from information relating to said request; and
   wherein said bottleneck analyzing unit further calculates a necessary multiplicity in said monitored system on the basis of a critical multiplicity indicative of a limit value of stable running of a server included in said monitored system, a critical CPU time indicative of a CPU time of said server for said critical multiplicity, said request generation rate, said average response, and said request path.

4. A server for modifying a multiplicity for a request in a monitored system, said server comprising:
   a processor and memory;
   a request measured value collecting unit for collecting an actually measured value of the multiplicity of the request on the basis of an element as a target of the request, a time band of the request, and information about a request path indicative of the element through which the request goes;
   a bottleneck analyzing unit for analyzing the collected measured value to analyze one of elements of said monitored system which forms a bottleneck for request processing;
   a multiplicity modifying unit for modifying the multiplicity so as to solve the bottleneck on the basis of a result of the analysis;
   an influence analyzing unit for analyzing an influence when the request processing is carried out on the basis of the modified multiplicity; and
   a multiplicity changing unit for changing the multiplicity about said request on the basis of a result of the influence analysis;
   wherein said server creates display information for displaying said bottleneck analysis result, said multiplicity modification result, and said influence analysis result; and
   wherein said bottleneck analysis result includes a multiplicity set value for the element to be monitored and a necessary multiplicity based on a request state, and said influence analysis result includes a multiplicity set value after modification, a current necessary multiplicity after recalculation calculated based on said bottleneck analysis result, and a future necessary multiplicity after the recalculation.

* * * * *